United States Patent [19]
Garney et al.

[11] Patent Number: 5,581,768
[45] Date of Patent: Dec. 3, 1996

[54] METHOD AND APPARATUS FOR EXECUTING APPLICATIONS IN PLACE FROM WRITE ONCE/SELDOM MEMORIES

[75] Inventors: John Garney, Aloha; Clifton W. Laney, Beaverton, both of Oreg.

[73] Assignee: INTEL Corporation, Santa Clara, Calif.

[21] Appl. No.: 394,619

[22] Filed: Feb. 27, 1995

[51] Int. Cl.⁶ ................................................. G06F 15/40
[52] U.S. Cl. ................................................... 395/674
[58] Field of Search ................................. 395/650, 700

[56] References Cited

U.S. PATENT DOCUMENTS

| | | | |
|---|---|---|---|
| 5,132,716 | 7/1992 | Samuels | 354/322 |
| 5,175,828 | 12/1992 | Hall | 395/375 |
| 5,319,751 | 6/1994 | Garney | 395/375 |
| 5,355,498 | 10/1994 | Provino et al. | 395/700 |
| 5,388,267 | 2/1995 | Chan et al. | 395/700 |
| 5,404,494 | 4/1995 | Garney | 395/700 |
| 5,410,707 | 4/1995 | Bell | 395/700 |
| 5,412,798 | 5/1995 | Garney | 395/700 |
| 5,495,586 | 2/1996 | Adachi et al. | 395/280 |
| 5,497,464 | 3/1996 | Yeh | 395/200.01 |

OTHER PUBLICATIONS

Williams, Tom, Software Interface opens doors for memory card applications, Jul. 1, 1990, p. 50(2).
Palmer, Scott D., Tiny PC Cards pack a punch, Apr. 15, 1992, p. 55(3).
PCMCIA, Execute in Place (XIP), 1992, 6-3→6-43, A1-A6, i-v.

Primary Examiner—Alvin E. Oberley
Assistant Examiner—John Q. Chavis
Attorney, Agent, or Firm—Blakely, Sokoloff, Taylor & Zafman

[57] ABSTRACT

A number of new utility and runtime functions are provided to an otherwise conventional operating system of a computer system that supports virtual memory and multitasking, including new linker, installer, memory management, loader and task management functions. The new linker function is used to partially resolve unresolved references of a conventional "RAM based" application, such that in conjunction with the new runtime functions, the partially resolved application can be executed in place from a "write once/seldom" storage medium. The new installer function is used to install the partially resolved application onto a "write seldom" storage medium. The new memory management function is used to reserve a predetermined portion of the operating system's memory management data structure for "mapping" the physical address span(s) of an installed application into a logical address space, thereby enabling the "mapped" application to be executed in place. The new loader function is used to pseudo-load and start execution of an XIP application. The new task management function is used to facilitate sharing of the predetermined portion of the operating system's memory management data structure by multiple XIP applications, thereby allowing multi-tasking of XIP applications as well as non-XIP or conventional "RAM based" applications by the operating system.

27 Claims, 36 Drawing Sheets

FIGURE 6d

RELOCATION DATA

| RELOCATION COUNT | RELOC ITEM 0 | RELOC ITEM 1 | ... | RELOC ITEM N |
|---|---|---|---|---|

152 — RELOCATION COUNT
154 — RELOC ITEM 0, RELOC ITEM 1, RELOC ITEM N
110a, 110b, or 110c

FIGURE 6e

RELOCATION ITEM (154)

| RELOC ADDR TYPE | RELOC REF TYPE | LOCATION OF RELOC ITEM OR PATCH SITE | |
|---|---|---|---|
| SELECTOR, POINTER, OFFSET | INT REF<br>IMP ORD<br>IMP NAME | | INT REF & FIXED<br>SEG#/ZERO/OFFSET<br>INT REF & MOVABLE<br>OFFH/ZERO/ORDINAL VALUE IN SEG TABLE<br>IMP ORD<br>IDX → MOD'S REF TABLE/FN'S ORDINAL VALUE<br>IMP NAME<br>IDX → MOD'S REF TABLE/OFFSET TO IMP_NAME TABLE |
| | NOTE: INCLUDE ADDITIVE FLAG | | |

156 — RELOC ADDR TYPE / SELECTOR, POINTER, OFFSET
158 — RELOC REF TYPE / INT REF, IMP ORD, IMP NAME
160 — LOCATION OF RELOC ITEM OR PATCH SITE
162 — INT REF & FIXED / INT REF & MOVABLE / IMP ORD / IMP NAME

| XIP_LINKER'S WORKING SEGMENT INFORMATION TABLE | 164, 166 |
|---|---|
| PRE-ALLOCATED SELECTOR ASSIGNED | 168 |
| SEGMENT TYPE (CODE/DATA) | 170 |
| # OF RELOC ITEMS | 172 |
| # OF RESTRUCTURABLE RELOC ITEMS | 174 |
| # OF SELECTOR RELOC ITEM | 176 |
| #OF POINTER RELOC ITEM | 178 |
| # OF OFFSET RELOC ITEM | |

FIGURE 6f

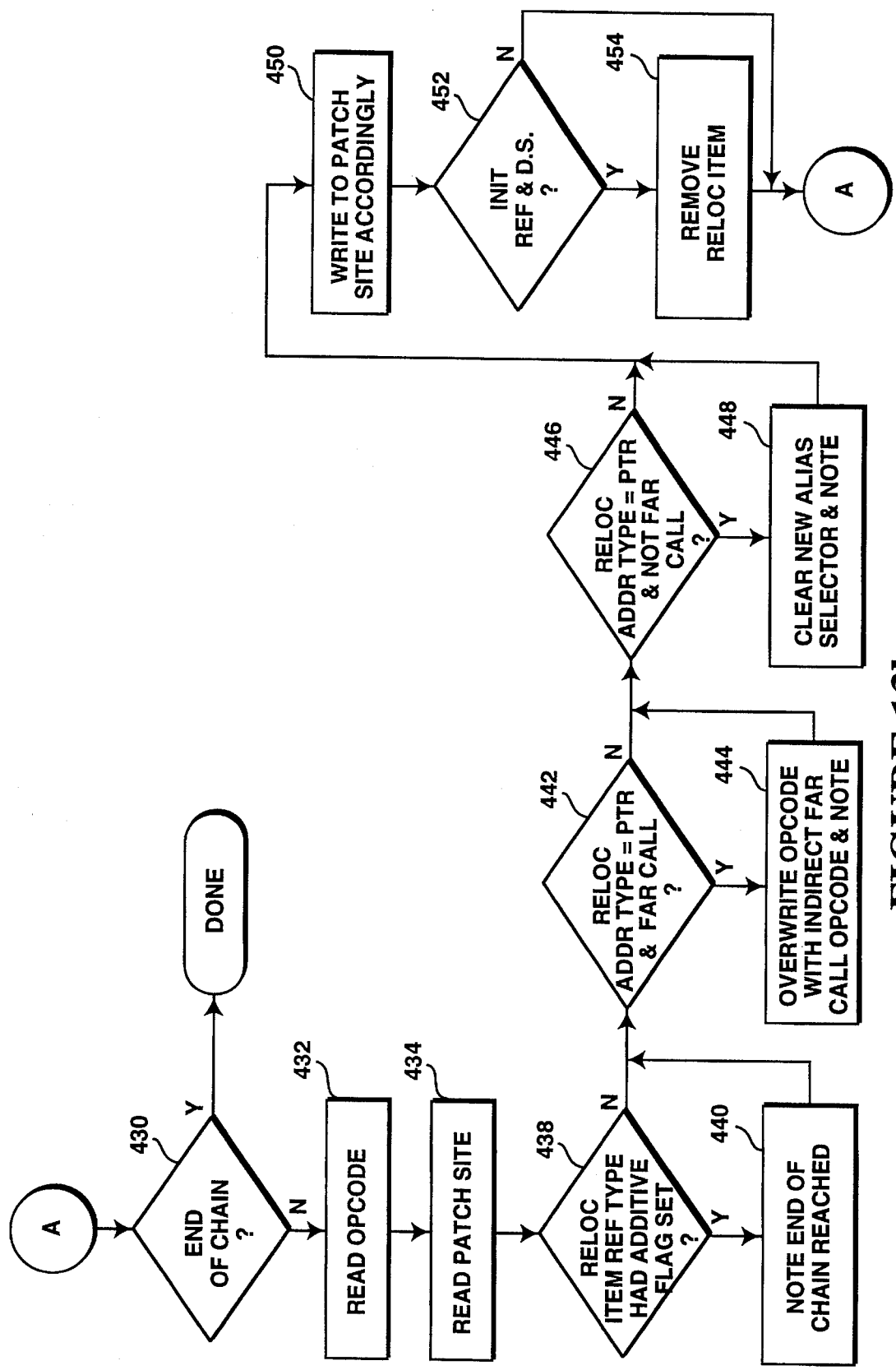

METHOD AND APPARATUS FOR EXECUTING APPLICATIONS IN PLACE FROM WRITE ONCE/SELDOM MEMORIES

BACKGROUND OF THE INVENTION

1. Field of the Invention

The present invention relates to the field of computer systems. More specifically, the present invention relates to method and apparatus for program execution on these computer systems.

2. Background Information

Computer applications (hereinafter application) are typically written and compiled to be executed from random access memory (RAM) against which write as well as read operations may be performed. These "RAM based" applications are also typically written to be "relocatable", that is, executable from any memory locations, thereby allowing the memory to be reused for different applications at different time and providing maximum flexibility for allocating memory to application programs. As such, memory references of a "relocatable" and "RAM based" computer application are dynamically resolved at load time, since their precise locations cannot be guaranteed at compile time.

Memory references in an application can be generally divided into two categories, memory references to memory locations within the application itself, i.e. internal references, or memory references to memory locations outside the application, i.e. external references. Particular examples of internal references include function calls crossing segment boundaries of a segmented application. Particular examples of external references include calls to functions provided by the operating system or environment. The relative locations of these memory references (within the application), also known as "patch sites", are typically identified and included as part of the "relocation information" of the application.

When the application is loaded into RAM in preparation for execution, the application loader uses its knowledge of the allocated memory locations of the application, the relative locations of the "patch sites", and the memory locations of the entry points of the external functions, to determine, or "resolve", the appropriate reference values that should be in the application code. The loader then "patches" or "fixes up" the application by writing these resolved reference values into the "patch sites" of the loaded application.

Since "write once" memory such as read-only-memory (ROM) and "write seldom" memory such as EPROM, or Flash cannot be or "easily" written into, typical applications developed in the above described manner cannot be "fixed up" if they are stored in these "write once/seldom" memory and are to be executed in place (XIP). Thus, traditionally, all XIP applications have to be specifically written to ensure there are no unresolved references at the time they (i.e. the absolute code image) are stored into the "write once/seldom" memory. As a practical matter, this is an extremely complex undertaking for any complex suite of applications, especially if external link libraries are involved.

Also historically, most XIP applications were developed for embedded applications. Due to the constraints of the embedded environments, XIP applications tend to employ overlays. Furthermore, only one XIP application is executed in any point in time, in other words, no multitasking of XIP applications.

With the advent of mobile computing and Personal Computer Memory Card International Association (PCMCIA) Cards, there is a renewed interest in XIP applications. If applications can be executed in place from ROM, Flash memory, PCMCIA cards and the like, it means smaller amount of RAM and/or disk storage may be provided, which would lead to a reduction in size and/or weight of notebook computers. It will be especially desirable if new XIP applications may be "easily" developed, and the large number of existing "RAM based" applications may be automatically "converted" to execute in place instead of having to re-write them. Furthermore, it will be desirable if XIP applications can be multitasked just like the "RAM based" applications.

At least one prior attempt is known to have been made to execute applications in place from ROM for a line of now defunct mobile computers. However, these XIP applications were similar to the traditional XIP embedded applications, i.e. they were specially written using overlays and not having any unresolved applications. Furthermore, the XIP applications had to provide their own memory management, including swapping of the appropriate memory ranges in and out of the processor's address space.

Subsequently, a PCMCIA standard application programming interface (API) was created for XIP applications. It was similar to what was done on the now defunct line of notebook computer in that the XIP applications had to be specially written using overlays and not having any unresolved relocation references. However, the PCMCIA API standardized and supported the required memory management, relieving the XIP applications from having to provide their own memory management. The memory management support is analogous to expanded memory (EMS) on personal computers.

What is needed is an integrated approach that enables conventionally developed "RAM based" applications to be storable and executable in place in "write once/seldom" memory, i.e. ROM, EPROM, EEPROM, Flash etc., in the above described desired manner. As will be described in more detail below, the present invention provides for such methods and apparatus that achieve these and other desired results.

SUMMARY OF THE INVENTION

The desired results are advantageously achieved by providing a number of new utility and runtime functions to an otherwise conventional operating system of a computer system that supports virtual memory and multitasking. These new utility and runtime functions include new linker, installer, memory management, loader and task management functions. The new linker function is used to partially resolve unresolved references of a conventional "RAM based" application, such that in conjunction with the new runtime functions, the partially resolved application can be executed in place from a "write once/seldom" storage medium. The new installer function is used to install the partially resolved application onto a "write seldom" storage medium. For "write once" storage medium, any number of well known semiconductor processes may be used. The new memory management function is used to reserve a predetermined portion of the operating system's memory management data structure for "mapping" the physical address span(s) of an installed application into a logical address space, thereby enabling the "mapped" application to be executed in place. The new loader function is used to pseudo-load and start execution of an XIP application. The new task management function is used to facilitate sharing of the predetermined portion of the operating system's memory management data structure by multiple XIP applications, thereby allowing multi-tasking of XIP applications as well as non-XIP or conventional "RAM based" applications by the operating system.

The new linker function reads the executable file of a conventional "RAM based" application, and partially resolves external as well as internal references to a predetermined portion of the operating system's memory management data structure that is reservable at system initialization time, such that these partially resolved references may be fully resolved at execution time by fixing up the reserved predetermined portion of the operating system's memory management data structure with the proper physical addresses. For some external references, the new linker function also restructures them into indirect external references through the R/W data area. The new linker function further fixes up various information tables in the executable file, and regenerates the executable file. The new installer function installs the regenerated executable file onto a "write seldom" medium, preserving the structural inter-dependencies, i.e. locational relationships of the different parts of the regenerated executable file.

The new memory management function reserves the predetermined portion of the operating system's memory management data structure by causing them to be allocated to the new memory management function at system initialization time. The new loader function pseudo-loads an installed application by causing RAM to be allocated for the application's R/W data area, and fixing up the preallocated predetermined portion of the operating system's memory management data structure with the proper physical addresses. The new loader function further informs the new task management function of each newly "loaded" XIP application.

The new task management function creates a private XIP task management data structure for XIP applications at system initialization time. In response to each notification of a new XIP application from the new load function, the new task management creates a new XIP task management data item in the XIP task management data structure for the newly "loaded" XIP application. Each XIP task management data item contains the fix-up data for the pre-allocated pre-determined portion of the operating system's memory management data structure, including data for relating selected subset of the pre-allocated predetermined portion to appropriate subset of dynamically allocated portion of the operating system's memory management data structure. The new task management function further maintains current XIP task information. Upon being notified by the operating system of a task switch, the new task management determines if an XIP application is involved. If an XIP application is involved, the new task management function swaps the proper fix-up memory management data into the pre-allocated pre-determined portion of the memory management data structure, and updates the current XIP task information accordingly.

In some embodiments, the new linker and installer functions are implemented as standalone utilities, whereas the new memory management, loader and task management functions are also implemented as standalone "extensions" to the operating system. In other embodiments, the new linker, memory management, loader, and task management functions may be implemented as an integral part of the respective portions of the operating system.

In one "standalone/extension" embodiment designed for the Windows™ Operating Environment (Windows is a trademark of Microsoft Corp. of Redmond, Wash.), the new linker and install functions are implemented with two standalone executables (EXEs) XIP_Linker and XIP_Installer, whereas the new memory management, loader and task management functions are jointly implemented with a dynamic link library (DLL) XIP_Loader, and a virtual device driver (VxD) XIP_Mgmt.

XIP_Linker partially resolves external as well as internal references of an otherwise conventional Windows™ application to a predetermined range of segment selectors, thereby enabling these partially resolved references to be fully resolved at execution time by fixing up the corresponding segment descriptors with the appropriate physical addresses. For external references involving pointers of FAR CALLs, XIP_Linker further restructures the external references into indirect external references through the application's automatic R/W data segment. XIP_Linker also inserts a self-loading segment having complementary invocation logic for invoking XIP_Loader, before fixing up the various information tables, and regenerating the executable file. XIP_Installer installs the regenerated executable file onto a "write seldom" storage medium, preserving the relative locations of the segments.

At system initialization time, XIP_Mgmt preallocates with Windows' kernel the predetermined range of segment selectors, and creates a task management structure. At "load" time of an XIP application, the self-loading segment of the XIP application is loaded and given control by Windows' loader. The self-loading segment in turn gives execution control to XIP_Loader. Upon receiving control, XIP_Loader updates the XIP application's module table, fixing up the preallocated predetermined segment selectors with the physical addresses of the "write once/seldom" medium, causes Windows' loader to allocate RAM for the automatic R/W data segment(s) of the XIP application being "loaded", thereby pseudo loading the XIP application. XIP_Loader further invokes XIP_Mgmt upon "loading" the XIP application.

Upon being invoked, XIP_Mgmt creates an XIP task management data item in the XIP task management data structure for the XIP application. The XIP task management data item contains all the fix-up data for the segment descriptors of the pre-allocated pre-determined range of segment selectors, including data for associating some of the pre-allocated segment selectors and some of the dynamically allocated segment selectors to each other. At task start up and task switching time of an XIP application, XIP_Mgmt swaps into the segment descriptors of the preallocated predetermined range of segment selectors the proper set of segment selector fix-ups for the current XIP task. XIP_Mgmt also tracks which XIP application is the current XIP task. At task terminating time, XIP_Mgmt clears the task management data item of the terminating XIP task. XIP_Mgmt is notified of task start-up, switching, and termination by XIP_Loader, which in turn relies on TOOLHELP.DLL of Windows™ to get notified.

In addition, a third Windows™ EXE, XIP_Init, is provided to address certain unique operating characteristics of Windows™. XIP_Init is used to create a dummy module using a dummy segment, and fix up all the corresponding segment descriptors of the preallocated predetermined range of segment selectors to point to the dummy segment using XIP_Mgmt at system start up time. XIP_Init is included as part of the programs that get executed during start up of Windows™. Additionally, XIP_Init is also used to fix up purposely created "meaningful bad pointers" when they are referenced by a running XIP application.

Lastly, a Windows™ COM, Card_Mapper, is provided to complement Windows™ for mapping an inserted PCMCIA Card into one or more predetermined ranges of physical addresses at the time the PCMCIA Card is inserted.

BRIEF DESCRIPTION OF DRAWINGS

The present invention will be described by way of exemplary embodiments, but not limitations, illustrated in the accompanying drawings in which like references denote similar elements, and in which:

FIGS. 6a–6g illustrate in further detail one embodiment of the utility extensions for supporting XIP applications designed for Windows™;

FIGS. 13a–13b illustrate the "fix up location" step of FIG. 12s in further detail;

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 1:
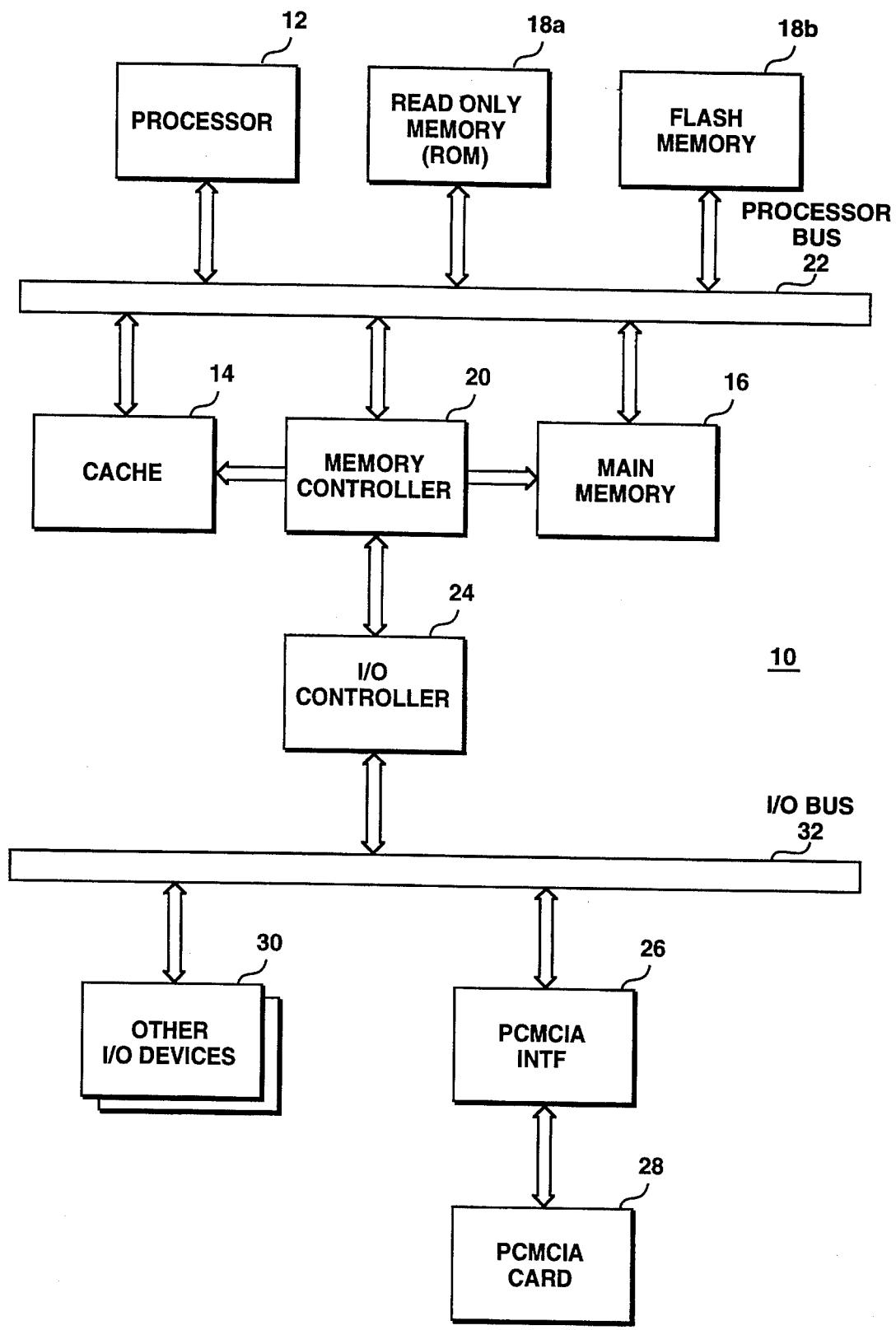
FIG. 1 illustrates an exemplary computer system incorporating the teachings of the present invention.

Referring now to FIG. 1, a block diagram illustrating an exemplary computer system incorporating the teachings of the present invention is shown. Exemplary computer system 10 includes processor 12, cache memory 14, main memory 16, ROM 18a, Flash memory 18b, memory controller 20, and processor bus 22 coupled to each other as shown. Exemplary computer system 10 further includes I/O controller 24, a PCMCIA interface 26, a PCMCIA card 28, other I/O devices 30 and I/O bus 32 coupled to each other as shown. The I/O and memory controllers 20 and 24 are also coupled to each other and include circuitry for mapping I/O devices into the physical address space of exemplary computer system 10. PCMCIA card 28 is removably coupled to PCMCIA interface 26 enabling different PCMCIA cards 28 having different program and/or data contents be coupled to PCMCIA interface 26. Other devices 30 may include common I/O devices such as keyboard, mouse etc., as well as special I/O devices such as device for writing onto a EPROM.

Except for the manner they are used, these elements are intended to represent a broad category of similar elements found in many computer systems whose constitutions and functions are well known and will not be otherwise further described. The manner these elements are used under the present invention will be described in detail below with additional references to the remaining figures.

Figure 2:
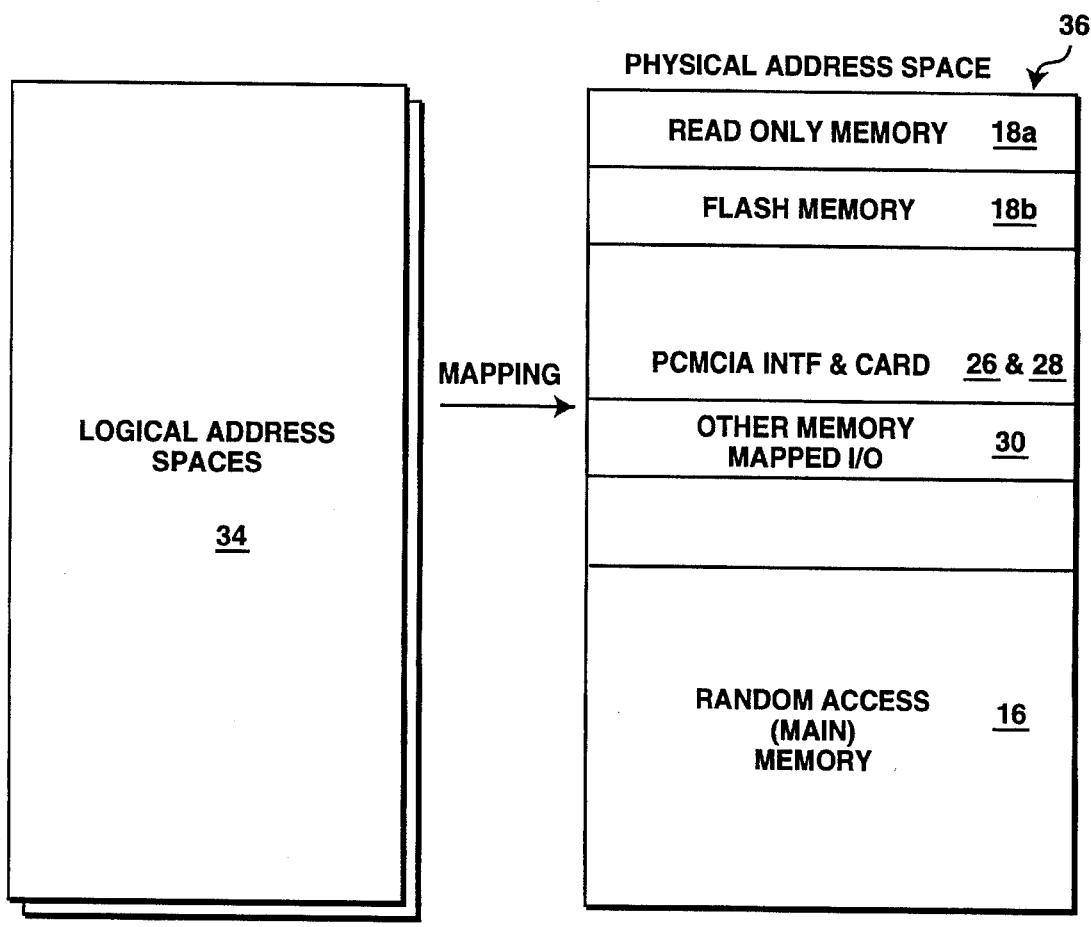
FIG. 2 illustrates mapping of I/O devices into the physical address space, and mapping of logical address spaces into the physical address space supported by the exemplary computer system of FIG. 1.

Turning now to FIG. 2, which illustrates the mapping of I/O devices into the physical address space, and mapping of logical address spaces into the physical address space supported by exemplary computer system 10 of FIG. 1. As shown, RAM 16, ROM 18a, Flash memory 18b, PCMCIA interface and card 26 and 28, and other memory mapped I/O devices 30 are mapped into different regions of physical address space 36. The locations of the regions may be predetermined or dynamically determined depending on the support provided by the memory and I/O controllers 20 and 24, and the operating system of exemplary computer system 10.

As shown, exemplary computer system 10 also supports mapping of multiple logical address spaces 34 into physical address space 36. As will be described in more detail below, exemplary computer system 10 also supports a multi-segment model of memory management, wherein each segment is a separate logical address space 34. These logical address spaces 34 are typically mapped directly or indirectly (via "intermediate" linear address spaces (not shown)) to different regions of physical address space 36. However they may be mapped directly or indirectly to the same region of physical address space 36.

Figure 3:
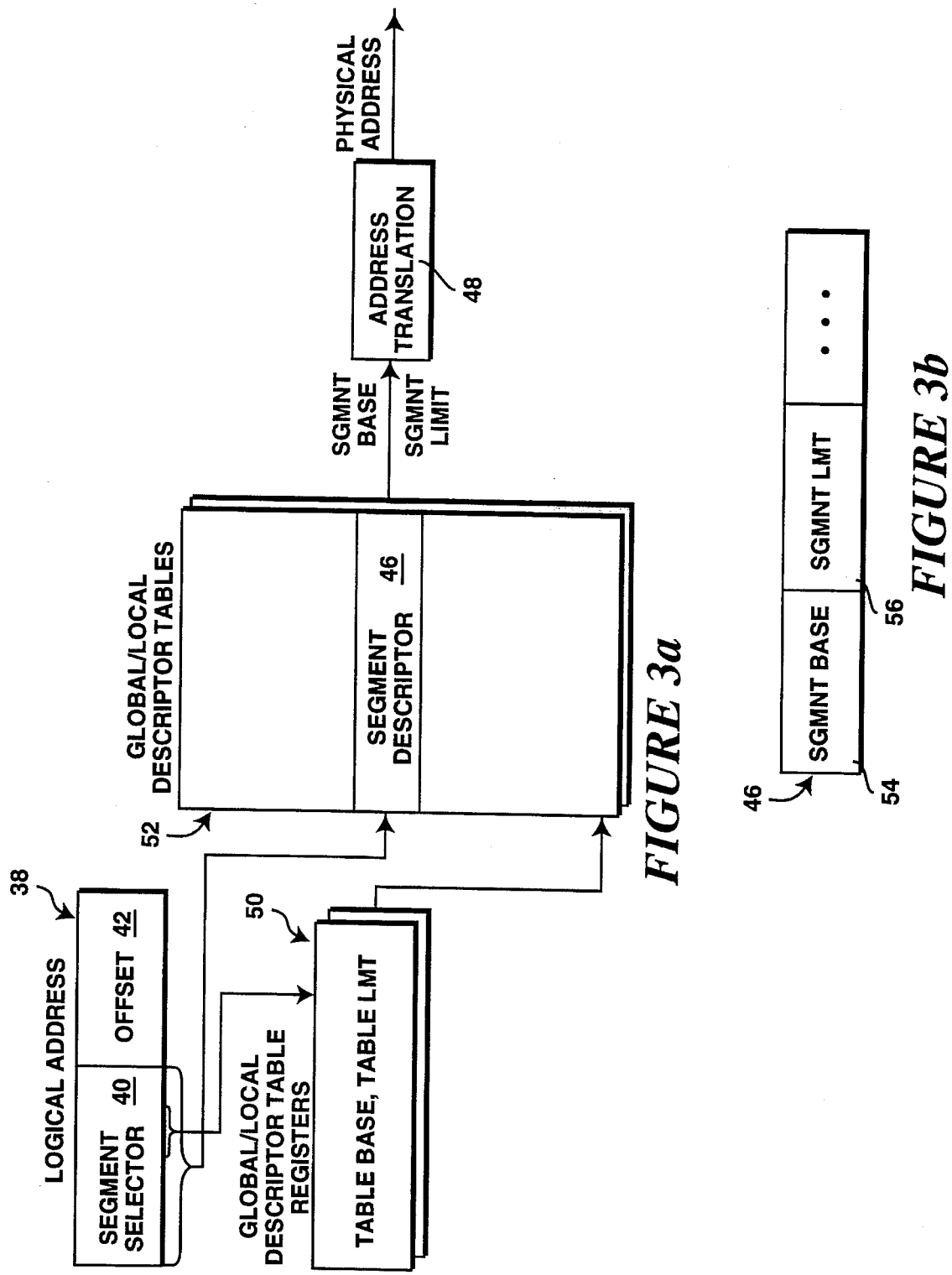
FIGS. 3a–3b illustrate various aspects of segmentation memory management supported by the exemplary computer system of FIG. 1.

FIGS. 3a–3b illustrate various key aspects of exemplary computer system 10 for supporting the multi-segment model of memory management. As shown, a logical address 38 comprises a segment selector 40 and an offset 42. Segment selector 40 is used to select a segment descriptor 46 stored in a global or local descriptor table 52, which is stored in main memory 16. The descriptor table base address and limit of the global/local descriptor table 52 are stored in one of the global/local descriptor table registers 50, which is part of processor 12. A portion of the segment selector 40 is used to determine whether the content of the global or local segment register 50 is to be used.

Each segment descriptor 46 comprises a segment base address 54 and a segment limit 56 of a memory segment. Address translation circuitry 48, which is a part of processor 12 uses the segment base address 54, segment limit 56 and offset 42 to generate the corresponding physical address for logical address 38.

Although the present invention is being described with exemplary computer system 10 supporting segmentation memory management, it will be appreciated by those skilled in the art that the present invention may also be practiced with a flat model of memory management, since mapping all logical address spaces 34 to the entire physical address space 36 is functionally equivalent to a flat model of memory management. Furthermore, the present invention may also be practiced with paging in lieu of or in combination with either the flat or segmentation model of memory management.

Figure 4:
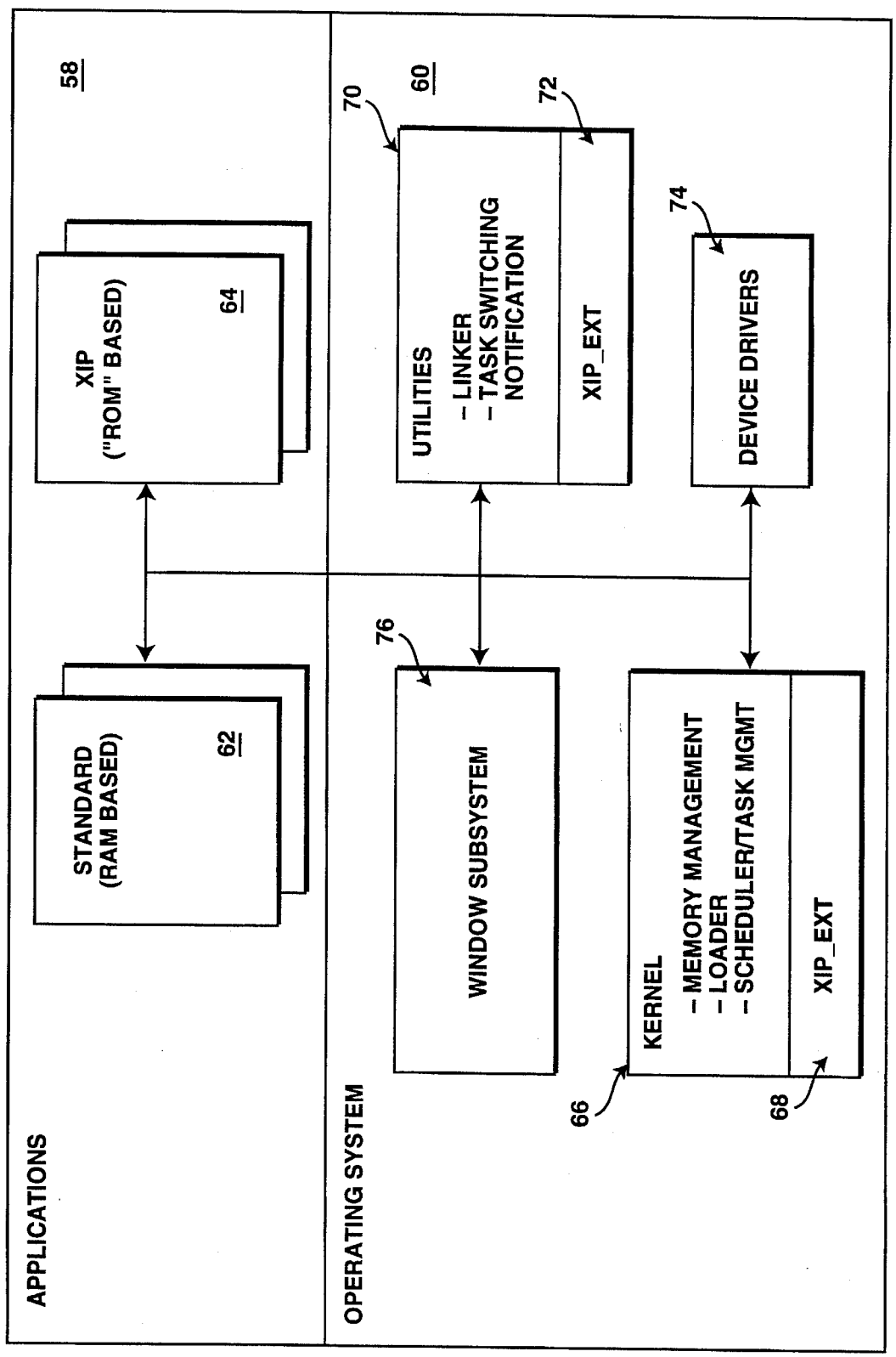
FIG. 4 illustrates the key software components of the exemplary computer system of FIG. 1.

Referring now to FIG. 4, a block diagram illustrating the key software elements of exemplary computer system 10 is shown. As illustrated, the key software elements include applications 58 and operating system 60 incorporated with the teachings of the present invention. Application 58 include conventional "RAM based" applications 62 and XIP applications 64 generated and executed in accordance to the teachings of the present invention. Operating system 60 includes kernel 66, utilities 70, device drivers 74, and preferably a windowing subsystem 76.

Kernel 66 performs memory management, program loading, task scheduling, task management and related functions. In particular, kernel 66 includes a memory management data structure for managing memory allocation to applications 58. Kernel 66 is further provided with "extended" memory management, loader, and task management functions 68 for XIP applications 64 in accordance to the teachings of the present invention, which will be described in more detail below. Utilities 70 perform functions such as linking, task switching notification. In particular, utilities 70 include a function for notifying task switching. Utilities 70 are further provided with "extended" linker and installer functions 72 for XIP applications 64 in accordance to the teachings of the present invention, which will also be described in more detail below. Device drivers 74 and Windows subsystem 76 perform their conventional functions well known in the art.

Figure 5A:
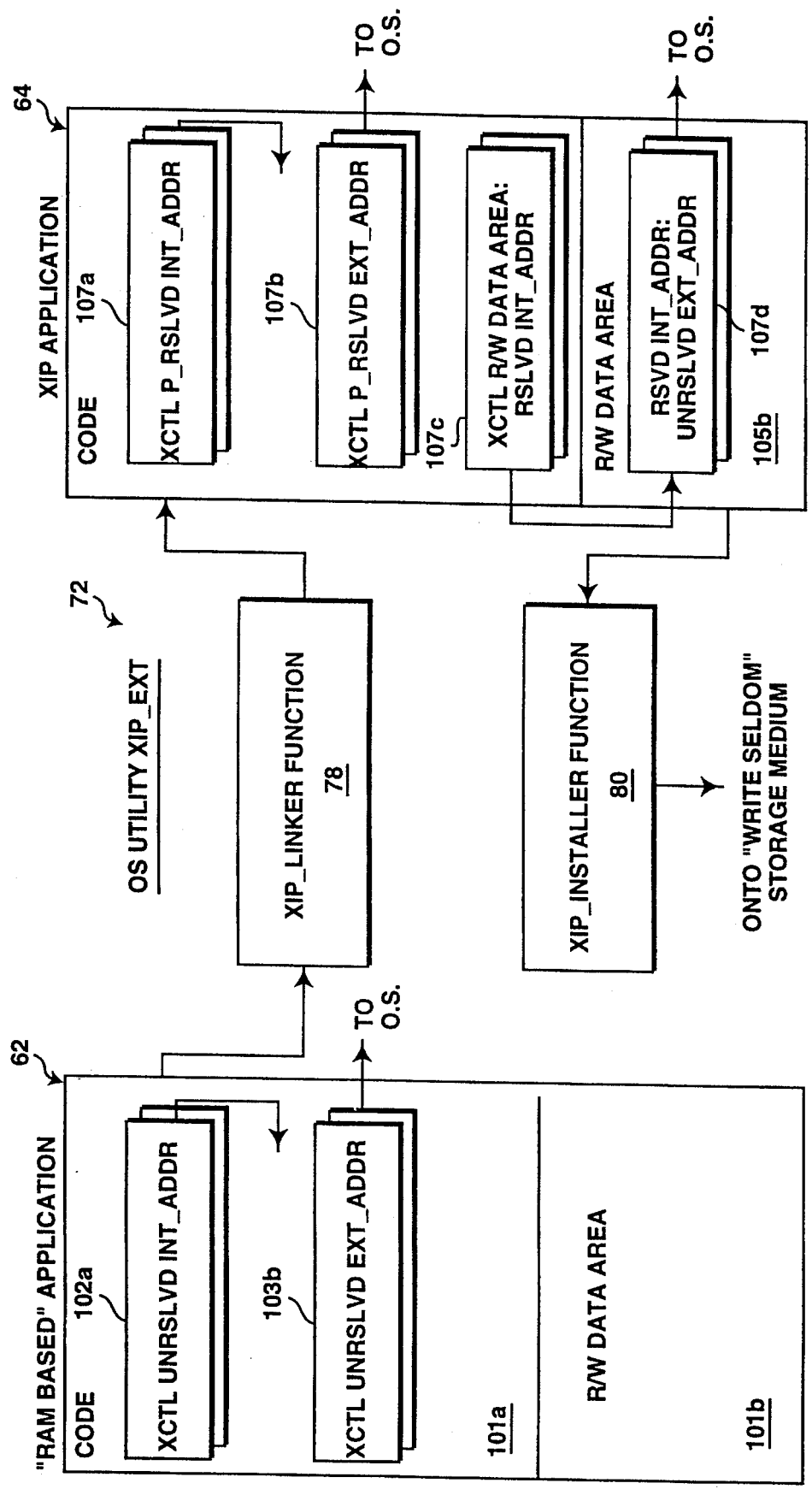
FIGS. 5a–5b illustrate the utility and kernel extensions of the present invention in further detail.
Figure 5B:
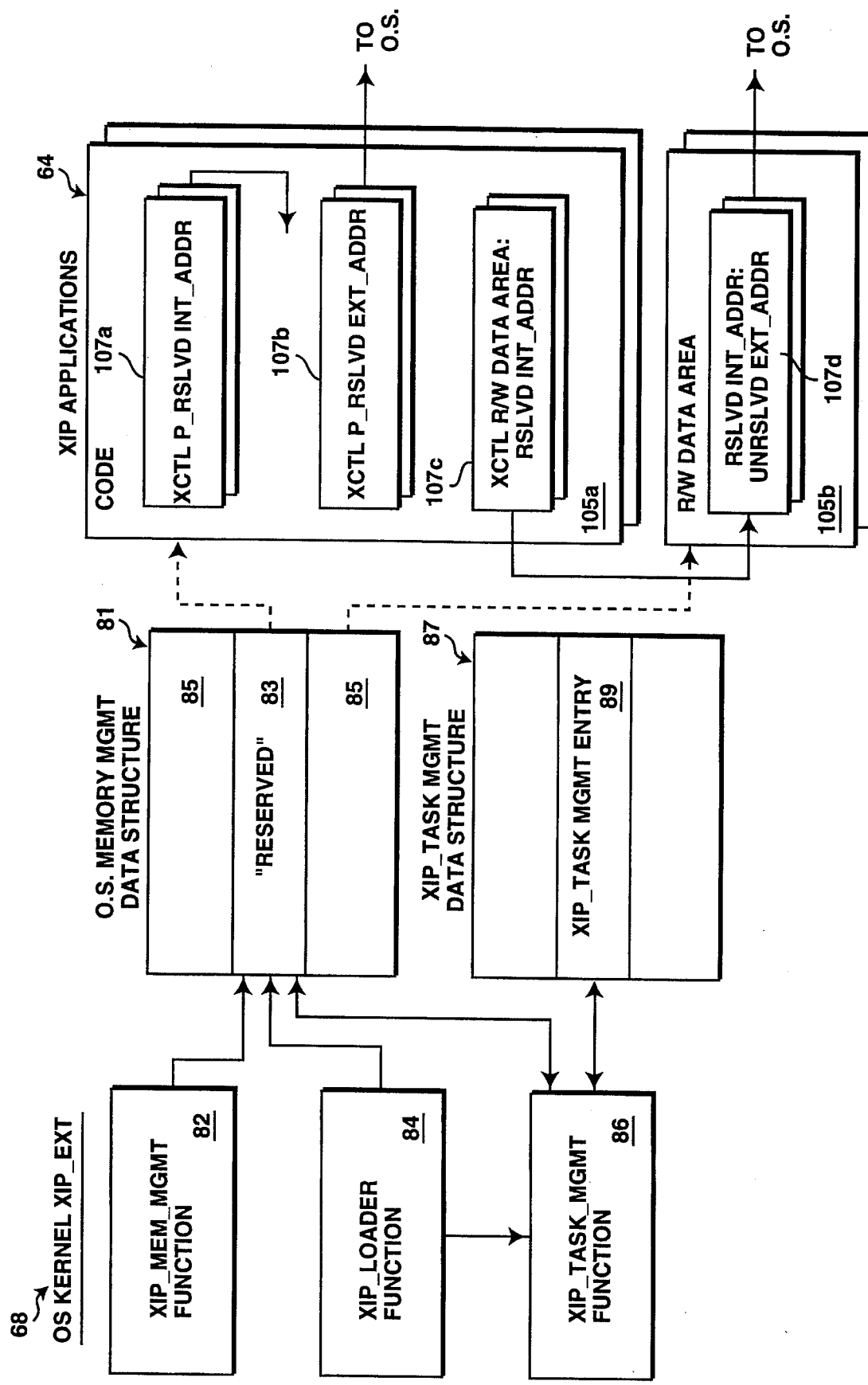

Referring now to FIGS. 5a–5b, the "extended" functions provided in accordance to the teachings of the present invention are illustrated in further detail. As shown, utility "extensions" 72 for XIP applications 64 include new linker function 78 and new installer function 80, whereas kernel (or runtime) "extensions" 68 for XIP applications 64 include new memory management function 82, new loader function 84 and new XIP task management function 86.

New linker function 78 is used to partially resolve references of a conventional "RAM based" application 62, such that in conjunction with the new runtime functions 68, the partially resolved application 64 can be executed in place from a "write once/seldom" storage medium 18a, 18b, or 28. New installer function 80 is used to install the partially resolved application 64 onto a "write seldom" storage medium 18b or 28. "Installation" of partially resolved application 64 onto a "write once" storage medium 18a may be accomplished using any number of well known semiconductor processes.

New memory management function 82 is used to reserve a predetermined portion 83 of the operating system kernel's memory management data structure 81 for "mapping" the physical address span(s) of an installed application 64 into a logical address space 34, thereby enabling the "mapped" application 64 to be executed in place. (Recall from earlier description that the XIP application 64 holding "write once/seldom" storage medium 18a, 18b or 28 is mapped into physical address space 36 by circuitry of memory and I/O controllers 20 and 24 and operating system 60.) New loader function 84 is used to pseudo-load and start execution of an XIP application 64. New task management function 86 is used to facilitate sharing of the predetermined portion 83 of memory management data structure 81 by multiple XIP applications 64, thereby allowing multi-tasking of XIP applications 64 as well as non-XIP or conventional "RAM based" applications 62 by operating system 60.

More specifically, new linker function 78 reads the executable file of a conventional "RAM based" application 62, locates the unresolved external as well as internal references 103a–103b (such as "unrslvd int_addr/ext_addr" of control transfer instructions "XCTL"), and partially resolves them. The partially resolved internal and external references 107a–107c (such as "p_rslvd int_addr/ext_addr") are resolved to the predetermined portion 83 of memory management data structure 81, thereby allowing them to be fully resolved at execution time by fixing up the predetermined portion 83 of memory management data structure 81 with the proper physical addresses. For some external references 106b, new XIP linker function 78 further restructures the external references 106b into indirect external references 107c–107d through the R/W data area 105b. New XIP linker function 78 further fixes up various information tables in the "RAM based" executable file 62, and regenerates the XIP executable file 64 (to be more fully described later).

New memory management function 82 reserves the predetermined portion 83 of memory management data structure 81 by preallocating them to itself at system initialization time. New loader function 84 pseudo-loads an installed application 64 by causing the operating system's kernel 66 to allocate RAM for the R/W data area 105b of the XIP application 64 and the preallocated predetermined portion 83 of memory management data structure 81 to be fixed up with the proper physical addresses. New loader function 84 further informs new task management function 86 of each newly "loaded" XIP application 64. New task management function 86 creates a task management data structure 87 for XIP applications 64 at system initialization time. In response to each notification from new loader function 84, new task management 86 creates a task management data item 89 in task management data structure 87 for the newly "loaded" XIP application 64. Task management data item 89 contains the fix-up data for the preallocated predetermined portion 83 of memory management data structure 81, including data for associating appropriate subportions of preallocated predetermined portion 83 and subportions of dynamically allocated portion 85 of memory management data structure 81 to each other. Upon being notified by operating system 60 of a task switch, new task management function 86 determines if an XIP application 64 is involved, and swaps the proper fix-up memory management data 89 into the preallocated predetermined portion 83 of memory management data structure 81. Similarly, upon being notified by operating system 60 of a task termination and an XIP application 64 is involved, new task management function 86 clears the task management data item 89 of the terminating XIP task.

New linker function 78 and new installer function 80 for supporting XIP applications 64 may be implemented as standalone utilities or in the alternative as integral parts of a conventional linker and a conventional file system respectively. Similarly, new memory management function 82, new loader function 84 and new XIP task management function 86 for supporting XIP applications 64 may be implemented as standalone "extensions" to kernel 66 or in the alternative as an integral part of kernel 66.

Figure 6A:
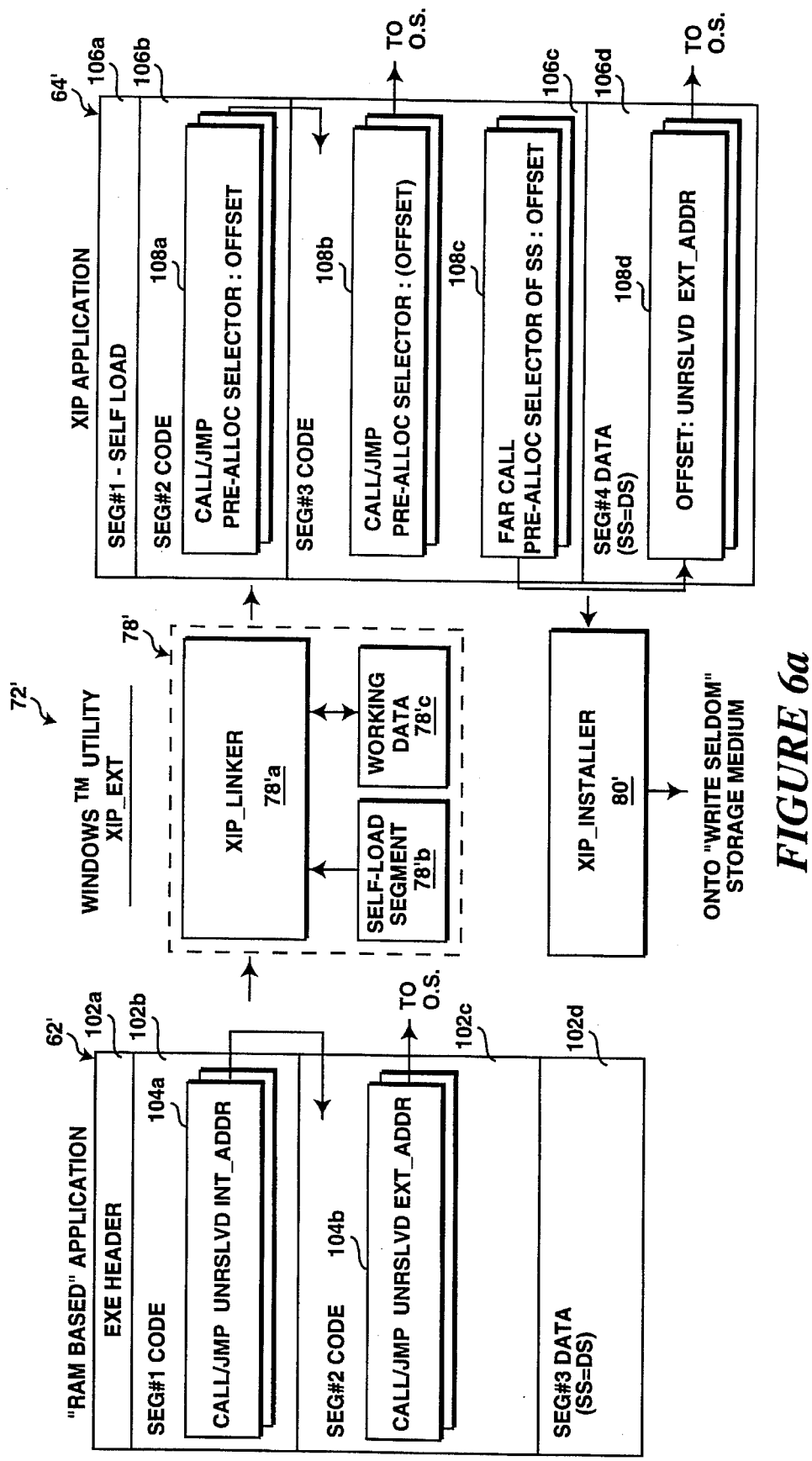
Figure 6B:
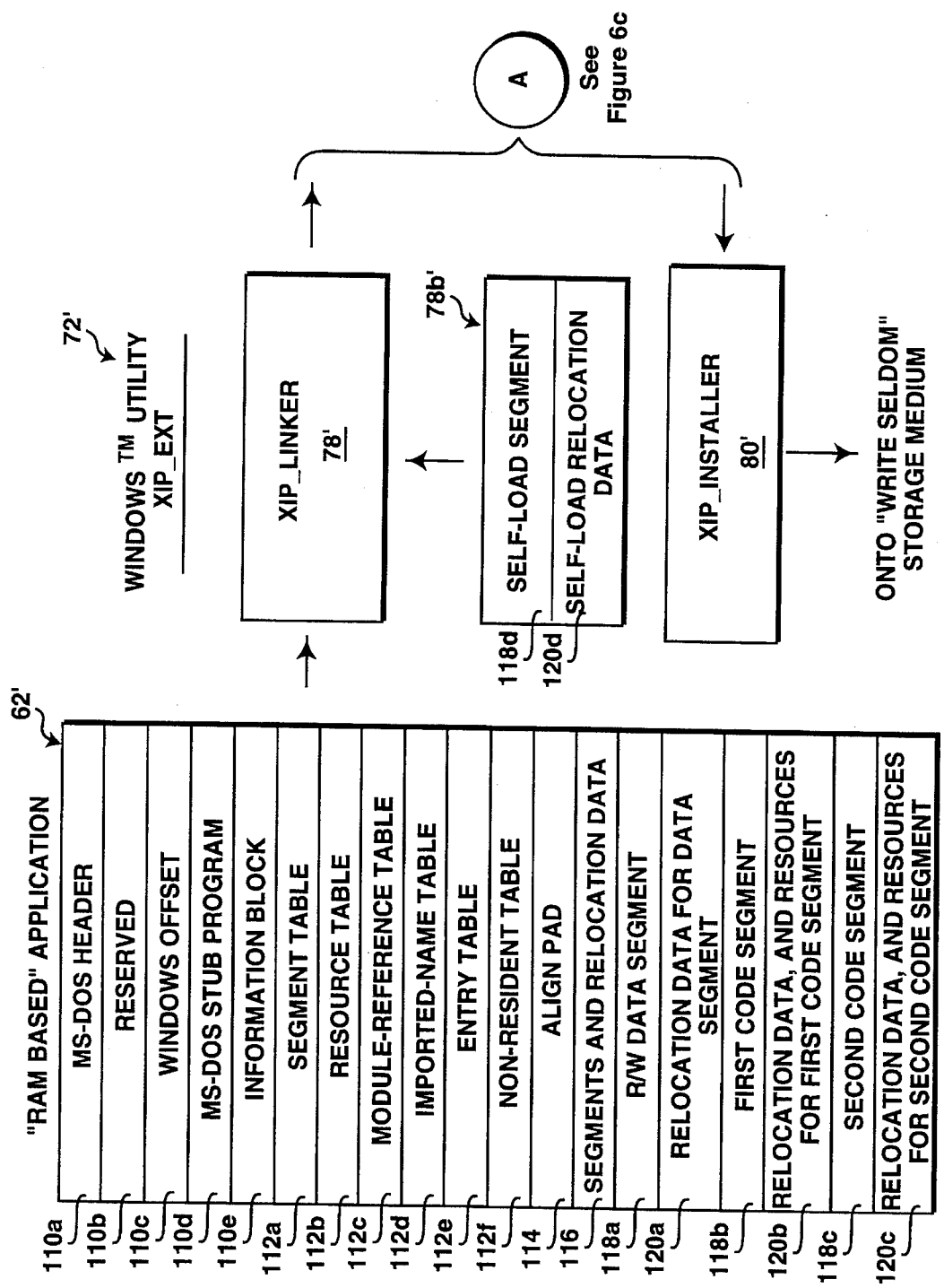
Figure 6C:
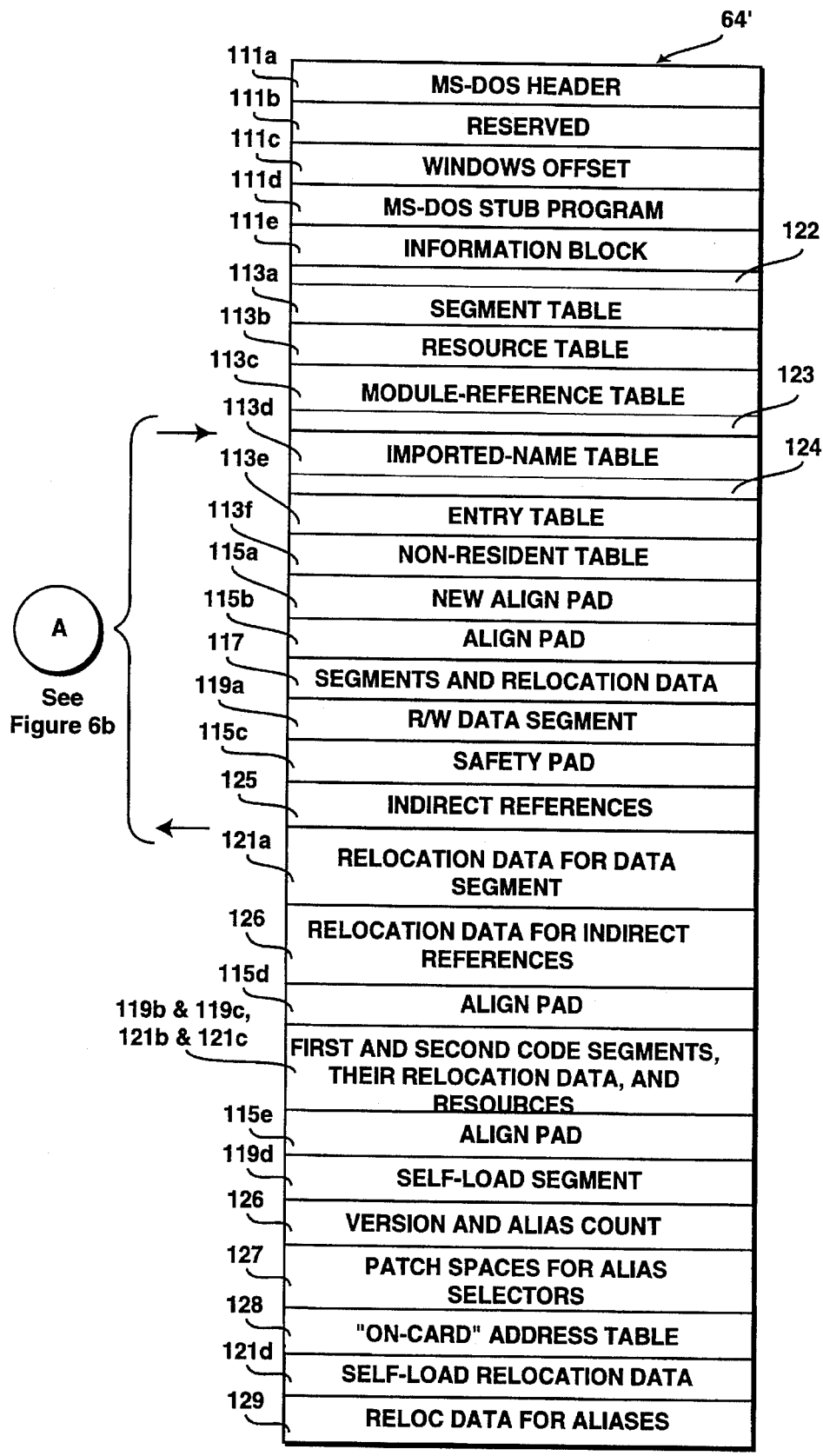
Figure 6G:
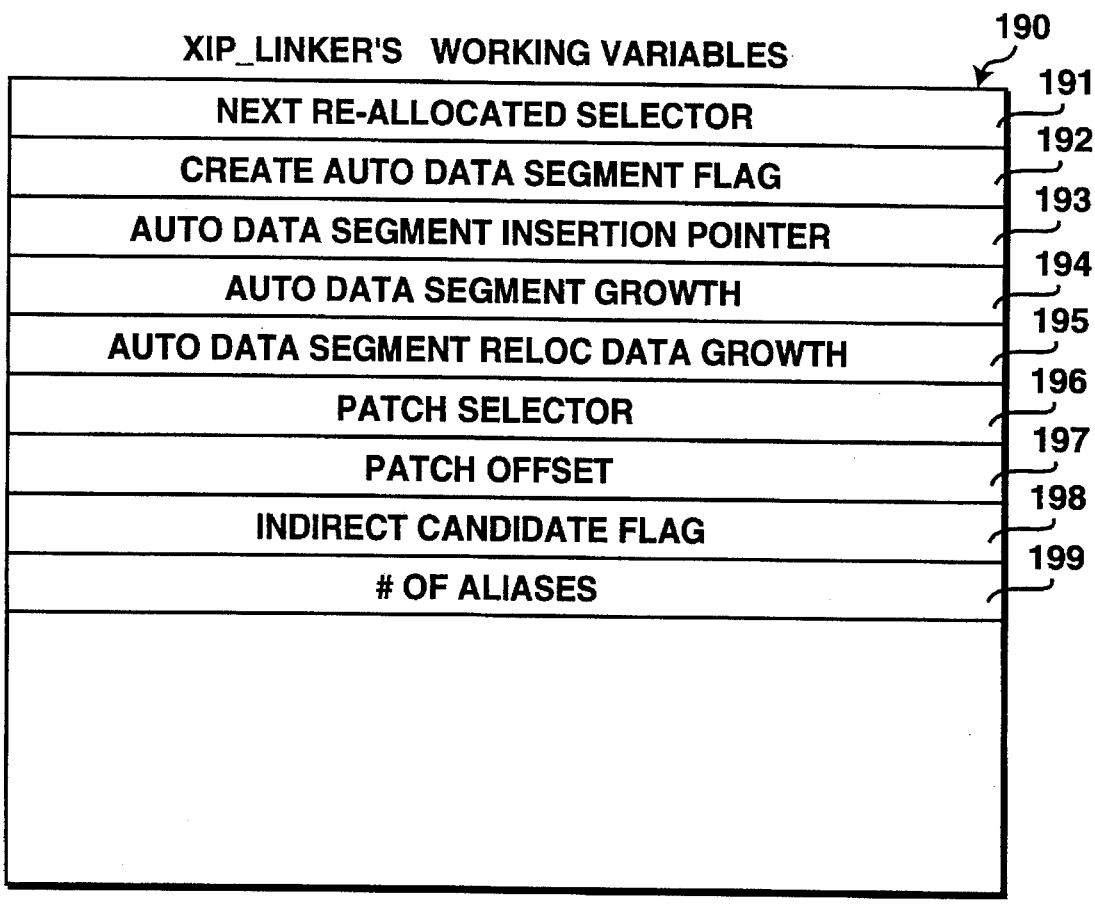

FIGS. 6a–6g illustrate one embodiment each of new linker and installer functions 78' and 80' for supporting XIP applications 64' designed for the Windows™ operating environment in further detail. FIGS. 6a–6c illustrate these embodiments of new linker and installer functions 78' and 80' using two views of "RAM based" application 62', and XIP application 64', a segmented view and a file organization view. FIGS. 6d–6e illustrate the relocation data 150 (i.e. descriptive information of the references) of "RAM based" application 62' in further detail, whereas FIGS. 6f–6g illustrate the working data 78'c–78'd of this embodiment of new linker function 78' in further detail. For ease of explanation, these embodiments of new linker and installer functions 78' and 80' are being illustrated in these figures with "RAM based" application 62' having two code segments 102b–102c and one automatic R/W data segment 102d, however based on the descriptions to follow, it will be appreciated by those skilled in the art that the present invention may be practiced with applications having any number of code segment(s) and any number of data segment(s), as long as there is an "equivalent" automatic R/W data segment.

In this embodiment, new linker function 78 and new installer function 80 are implemented as two standalone Windows™ EXEs, XIP_Linker 78'a and XIP_Installer 80' respectively. Furthermore, XIP_Linker 78'a is provided with a complementary self-load segment 78'b and working data 78'c. As will be obvious from the descriptions to follow, other embodiments need not make use of self-load segment 78'b if the targeted operating systems/environments provide functions "equivalent" to those provided by self-load segment 78'b.

XIP_Linker 78'a reads the executable file of "RAM based" application 62', locates external as well as internal references 104a–104b (such as "unrslvd ext_addr/int_addr" of control transfer instructions "CALL/JMP"), and partially resolves them. The partially resolved references 106a–106d are partially resolved to a predetermined range of segment selectors 83 managed by Windows' kernel (such as "pre-allocated selector:offset"), thereby allowing the partially resolved references 108a–108d to be fully resolved at execution time by fixing up the predetermined range of segment selectors 83 with the proper physical addresses. XIP_Linker 78'a records various working data 78'c to facilitate partial resolution of references 104a–104d. XIP_Linker 78'a regenerates the executable file 64' using the partially resolved references 108a–108d, inserting self-loading segment 78'b and fixing up various information tables 103a–103f.

Unresolved references 104a–104b are described in relocation data 120a–120c of the respective segments 118a–118c. Each group of relocation data 120a, 120b, and 120c comprises a relocation item count 152 and one or more relocation items 154 (if the relocation item count is non-zero). Each relocation item 154 comprises the relocation item's address type 156, reference type 158, patch site 160, and resolution or index to resolution data 162. Relocation item address type 156 includes selector, pointer and offset address types. Relocation reference type 160 includes internal reference type, import ordinal type and import name type. Included with each relocation type 160 is an additive flag denoting whether the offset value at the patch site is to be added to the resolution data or to be used as a pointer to a chained patched site. Resolution or index to resolution data 162 includes either the segment and offset values for a fixed internal reference, or an index value to the resolution data for the other relocation reference types. Usage of these data will be described in further detail below.

Working data 78'c includes segment information table 164 and variables 190. Segmentation information table 164 includes for each segment, preallocated selector assigned 166, segment type 168, number of relocation items 170, number of restructurable relocation items 172, number of selector relocation items 174, number of pointer relocation items 176, and number of offset relocation item 178. Variables 190 include next unused pre-allocated selector 191, create auto R/W data segment flag 192, auto R/W data segment insertion pointer 193, auto R/W data segment growth 194, auto R/W data segment relocation data growth 195, patch selector 196, patch offset 196, indirect candidate flag 198 and number of aliases 199. Similarly, usage of these data will be described in further detail below.

Self-load segment 78'b includes complementary invocation logic for invoking new XIP loader function 84 in its code segment 118d, exploiting the self-loading feature of Windows™ (which will be more fully described below). Similar to other segments, self-load segment 78'b also includes relocation data 120d.

XIP_Install 80' installs the regenerated executable file 64' onto a "write seldom" storage medium 18b or 28, preserving the relative locations of the segments 106b and 106c to be executed in place. XIP_Install 80' may be implemented in a wide variety of manners that are well within the ability of one skilled in the art, thus will not be further described.

Figure 7A:
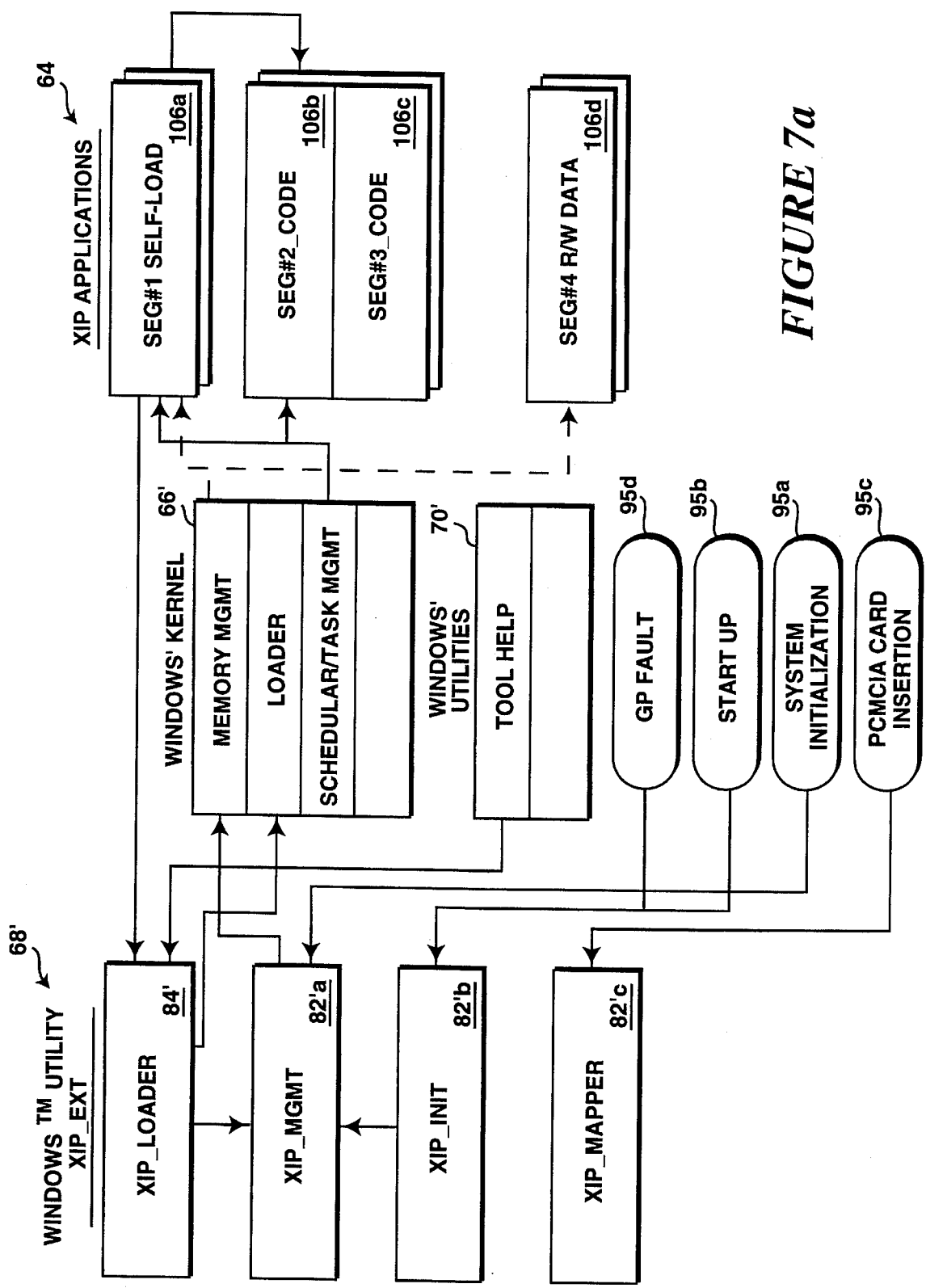
FIGS. 7a–7d illustrate in further detail one embodiment of the kernel extensions for supporting XIP applications designed for Windows™.
Figure 7B:
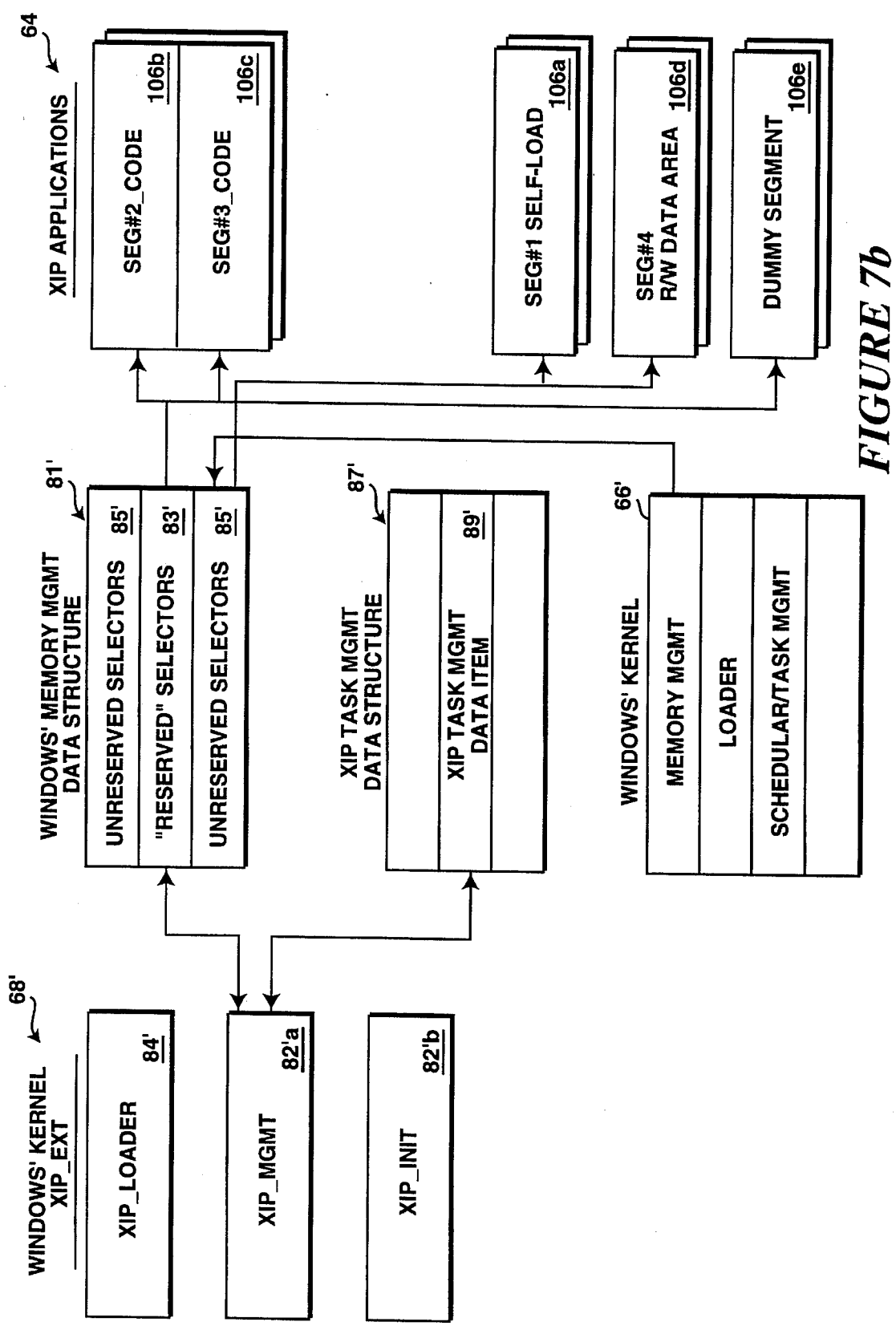
Figure 7C:
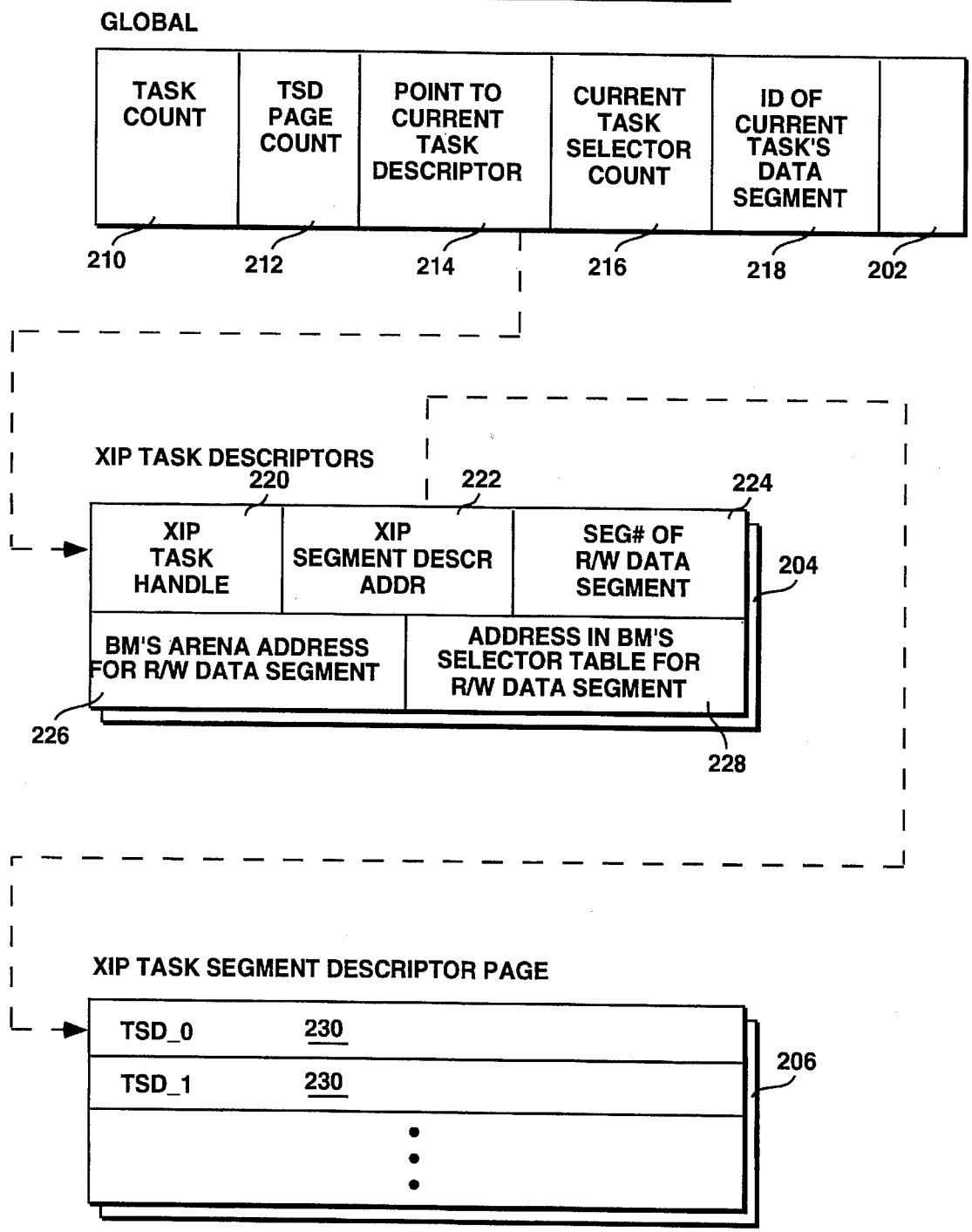
Figure 7D:
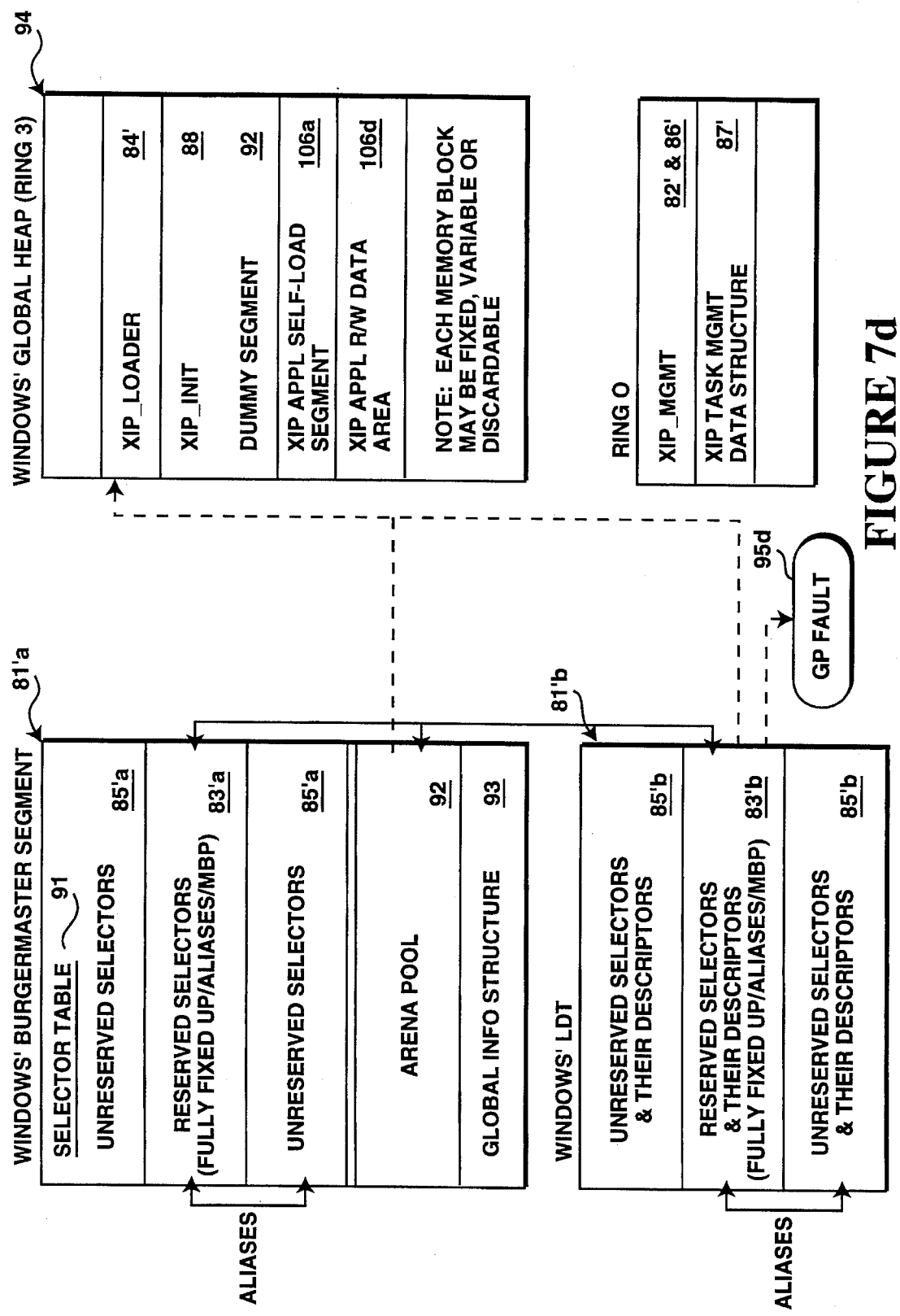

FIGS. 7a–7c in conjunction with FIG. 7d illustrate one embodiment of new XIP memory management, loader and task management functions 82'a–82'c and 84' designed for the Windows™ operating environment in further detail. FIG. 7a illustrates interactions of these new functions 82'a–82'c and 84 with Windows' kernel 66' and utilities 70', and XIP applications 64', whereas FIG. 7b illustrates interactions of these new functions 82'a–82'c and 84 with Windows' memory management data structure 81'. FIG. 7c illustrates the task management data structure 87' of the present invention in further detail, whereas FIG. 7d illustrates Windows' memory management data structure 81a' and 81b' in further detail.

In this embodiment, new XIP memory management, loader and task management function 82–86 are jointly implemented with an XIP_LOADER 84' and an XIP_Mgmt 82'a. Additionally, XIP_Mgmt 82'a is complemented with XIP_Init 82'b and XIP_Mapper 82'c. As will be obvious from the description to follow, XIP_Init 82'b and XIP_Mapper 82'c need not be used in other embodiments designed for other operating systems/environments that offer "equivalent" functions provided by XIP_Init 82'b and XIP_Mapper 82'c.

As shown, XIP_Mgmt 82'a is invoked at system initialization time, at which time, XIP_Mgmt 82'a reserves the predetermined range of selectors 83' by pre-allocating the segment selectors 83'. XIP_Mgmt 82'a preallocates the segment selectors 83' by repeatedly requesting Windows' kernel 66' to allocate segment selectors to XIP_Mgmt 82'a until the predetermined range of selectors 83' are so allocated. Selectors outside the predetermined range of selectors 83' are then released by XIP_Mgmt 82'a. Segment selectors managed by Windows' kernel 66' are stored in Windows' LDT 81'b. In addition, Windows' kernel 66' maintains what's known in the art as Windows' Burgermaster segment 81'a comprising a selector table 91 "mirroring" Windows' LDT 81'b, an arena pool 92 for tracking the free memory block in Windows' global heap 94, and information 93 about the Burgermaster segment 81'a.

In addition, at system initialization time, XIP_Mgmt 82'a creates an "empty" XIP task management data structure 87' for facilitating multitasking of XIP applications 64'. When populated during operation, the XIP task management data structure 87' comprises multiple XIP task descriptors 204, one per XIP task, and corresponding XIP task segment descriptor pages 206, also one per XIP task. Each XIP task descriptor 204 comprises an XIP task handle 220 identifying the XIP task, an XIP segment descriptor page address 222 locating the corresponding XIP task segment descriptor page 206, the segment number of the automatic R/W data segment 224, and Burgermaster's arena address and address of the selector table entry for the automatic R/W data segment 226 and 228. Each XIP segment descriptor page 206 comprises multiple task segment descriptors 230 of the XIP application 64'. XIP task management data structure 87' also includes global task information 202 such as total task count 210, task segment descriptor page count 212, a pointer 214 to the current task's descriptor 204, current task's selector count 216, and current task's automatic R/W data segment identifier 218. Together, these information enable the corresponding segment descriptors of the pre-allocated segment selectors 83'b to be properly fixed up for "interleaved" execution of multiple XIP applications 64', effectively introducing another layer of virtualization on top of the logical address spaces 34. As will be described in more detail below, "fixing up" the predetermined range of segment selectors 83' includes direct fix up of some of the corresponding segment descriptors of preallocated segment selectors 83'b with physical addresses of the "write once/seldom" medium 18a, 18b or 28, aliasing some of the pre-allocated segment selectors 83'b and dynamically allocated segment selectors 85'b to each other, and/or pseudo-aliasing some of the pre-allocated segment selectors 83'b as "meaningful bad pointers" or MBPs. MBPs are employed to address the Windows' characteristic that memory blocks allocated from Windows' global heap may be movable. MBPs are fully resolved to their true dynamically allocated alias selectors at the time they are referenced. Usage of these information will be described in more detail below.

XIP_Init 82'b is invoked at Windows™ start up time. XIP_Init 82'b creates a dummy module using dummy XIP segment 106e, preferably a 64K segment. XIP_Init 82'b then invokes XIP_Mgmt 82'a to create an XIP task descriptor 204 and a corresponding XIP task segment descriptor page 206 for dummy XIP segment 106e. The XIP task descriptor 204 and the corresponding XIP task segment descriptor page 206 contain information, when applied to the segment descriptors of the pre-allocated range of segment selectors 83'b in Windows' LDT 81'b, point all pre-allocated range of segment selectors 83'b to dummy XIP segment 106e. The XIP_Mgmt 82'a then applies the contained information accordingly effectuating the desired referencing of all pre-allocated range of segment selectors 83'b to dummy XIP segment 106e.

XIP_Mapper 82'c is invoked responsive to insertion of a PCMCIA card 28. When invoked, XIP_Mapper 82'c maps the newly inserted PCMCIA card 28 into one or more ranges of physical addresses. For simplicity of implementation, on systems where there are range(s) of physical addresses typically "unused", XIP_Mapper 82'c may map inserted PCMCIA cards to one or more predetermined ranges of physical addresses. Mapping an inserted PCMCIA card into one or more ranges of physical addresses is well known in the art, thus XIP_Mapper 82'c will not be further described.

XIP_LOADER 84' is invoked by the self-load segment 106a at XIP application load time. The self-load segment 106a is loaded and given control by Windows' kernel 66' in accordance to Windows' self-load feature, whenever loading of XIP application 64' is requested. Upon invocation, XIP_LOADER 84' modifies XIP application's module table fixing up the pre-allocated predetermined range of segment selectors 83' with physical addresses of the "write once/seldom" medium 18 or 28, and causes Windows' kernel 66' to allocate RAM for the automatic R/W data segment 106d, thereby pseudo-loading the XIP application 64'. XIP_LOADER 84' further causes Windows' kernel 66' to start execution of XIP application 64'. When execution starts, XIP_LOADER 84' is given control again via self-load segment 106a, which in turn invokes XIP_Mgmt 82'a to finish fixing up the predetermined range of segment selectors 83'. In response, XIP_Mgmt 82'a creates the XIP task descriptor 204 and the corresponding XIP task segment descriptor page 206 for the XIP application 64', and applies the information to fixing up the segment descriptors of the pre-allocated pre-determined range of segment selectors 83'.

XIP_LOADER 84' is also invoked by Windows' utility 70' (TOOLHELP) during task switching. Upon invocation, XIP_LOADER 84' relays the information to XIP_Mgmt 82'a. In response, XIP_Mgmt 82'a determines if an XIP task is involved. If an XIP task is involved, XIP_Mgmt 82'a swaps the proper fix-up information into segment descriptors of the predetermined range of segment selectors 83'b.

Lastly, XIP_Init 82'b is invoked responsive to a memory general protection fault or GP fault. XIP_Init 82'b determines if the GP fault is caused because a MBP is referenced. If the GP fault is caused by a MBP reference, XIP_Init 82'b disassembles the fault triggering instruction to obtain the selector. XIP_Init 82'b then uses the selector 83' to index into the segment descriptor table 52 and retrieve the real segment selector number from the base portion 54 where it was stored earlier by XIP_Mgmt 82'a (as will be described later). Upon retrieving the real segment selector number, XIP_Init 82'b restarts the instruction using the real segment selector 85'.

Figure 8:
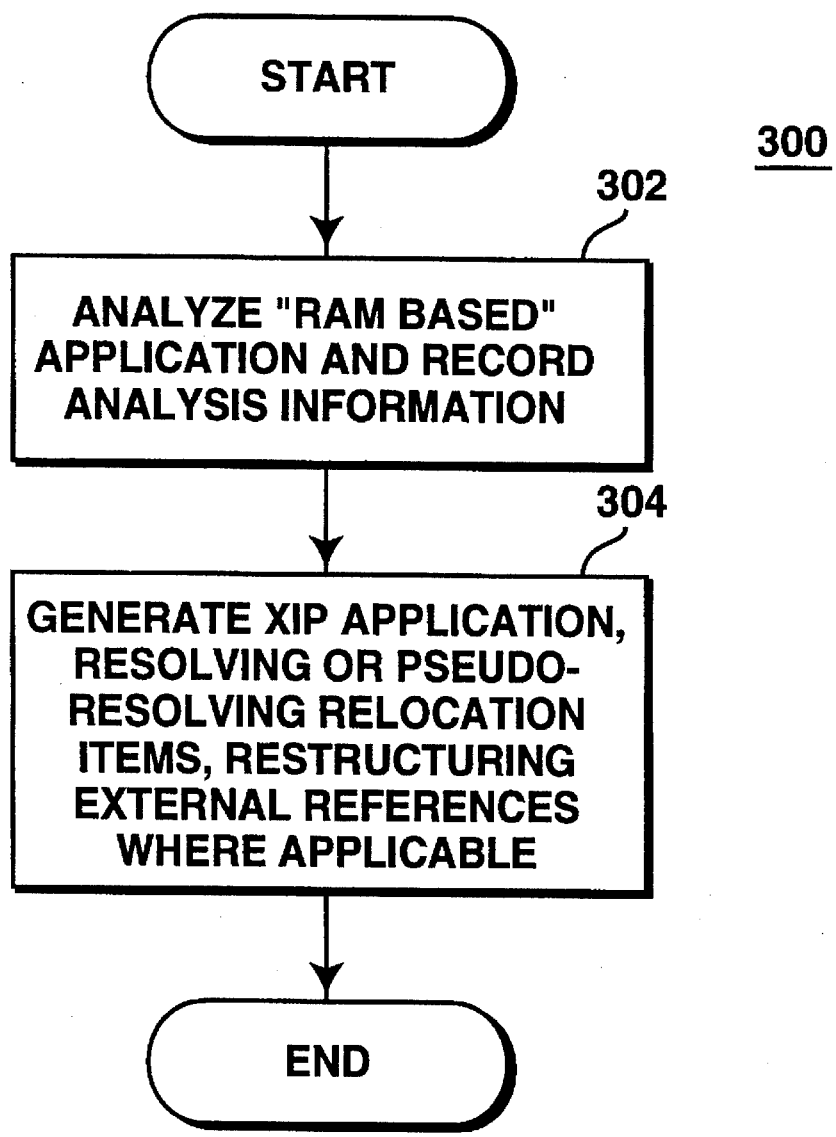
FIG. 8 illustrates the steps for restructuring and partially resolving memory references of an otherwise conventional "RAM based" application performed by one embodiment of XIP_Linker.

FIGS. 8–10, 11a–11b, 12a–12c, 13a–13b and 14 illustrate one embodiment of the operation logic of XIP_Linker 78'a in further detail. As shown in FIG. 8, for the illustrated embodiment, XIP_Linker 78'a has a two pass operational flow 300. On the first pass, XIP_Linker 78'a reads the executable file of the "RAM based" application 62', analyzes the "RAM based" application, in particular, the relocation items, and records the relevant information for partially resolving the references, step 302. On the second pass, XIP_Linker 78'a regenerates the executable file transforming the application into an XIP application 64' including partially resolving the relocation items, restructuring external references where applicable, and fixing up the information tables, step 304. Additionally, although not illustrated, XIP_Linker 78'a may also include preliminary step(s) for screening out "unsuitable" executable files. Particular examples of "unsuitable" executable files include those files with linkedit errors and files that already use the self-loading feature.

Figure 9:
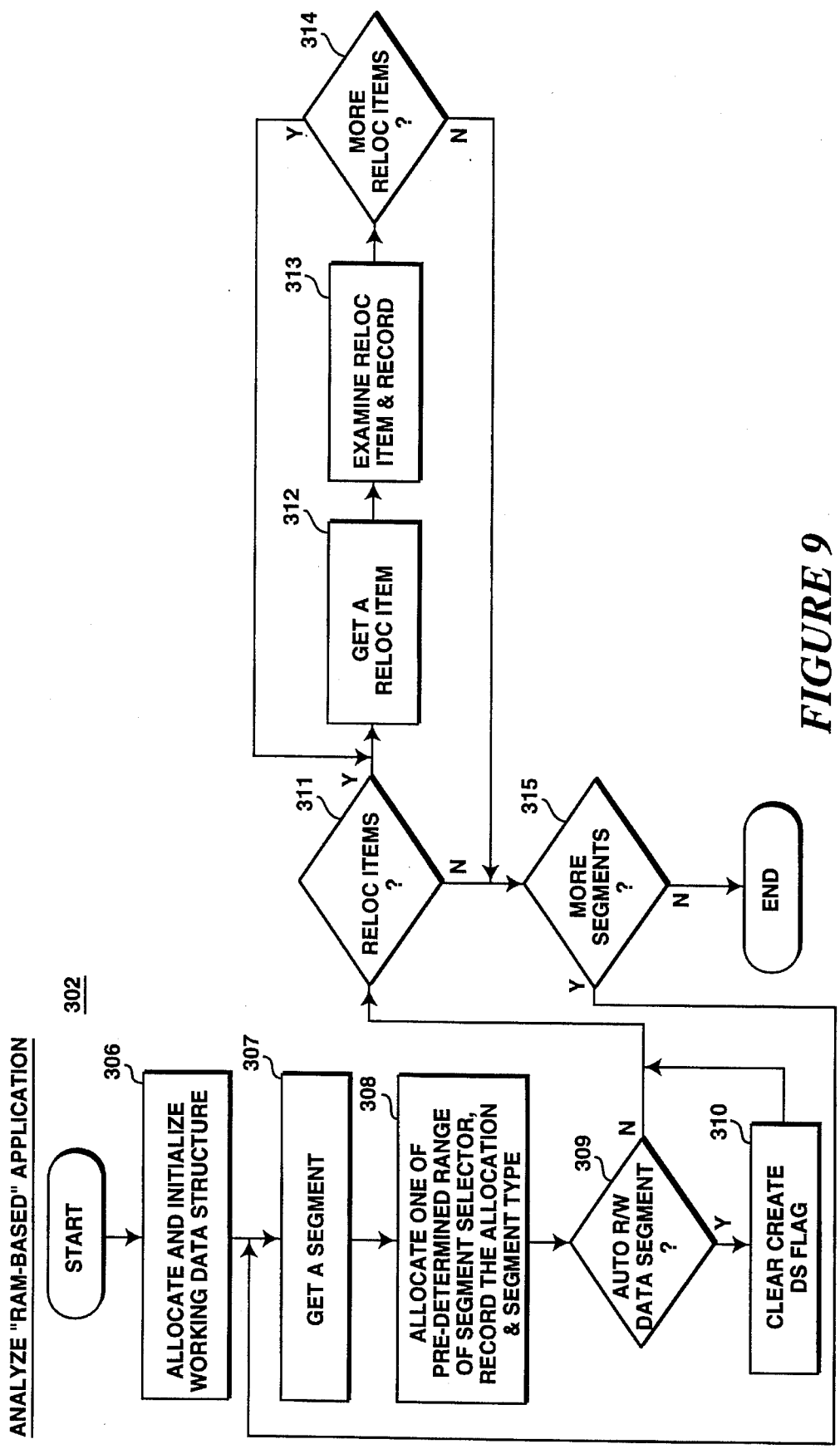
FIG. 9 illustrates the "analyze and record" step of FIG. 8 in further detail.

FIG. 9 illustrates "analyze and record" step 302 in further detail. As shown, XIP_Linker 78'a first allocates and initializes the working data structure 78'c described earlier, step 306. For the illustrated embodiment, the "Create auto R/W data segment (DS) flag" 192 is initialized to denote "auto R/W DS creation required". Next, XIP_Linker 78'a locates a segment 102b–102d, step 307. Typically, the segments 102b–102d are located in sequential order. XIP_Linker 78'a then allocates one of the pre-determined range of segment selectors 83' to the located segment 102b–102d and records the allocation, step 308. Typically, segment selectors 83' are also allocated in sequential order. XIP_Linker 78'a also records the segment type 168, i.e. code or data, step 308. If the segment is the auto R/W data segment 102d, XIP_Linker 78'a changes the "Create auto R/W DS flag" 192 to denote "auto R/W DS creation not required", step 310.

Next, regardless of segment type, XIP_Linker 78'a determines if the located segment 102b–102d has relocation items 154, step 311. If the located segment 102b–102d has relocation items 154, XIP_Linker 78'a gets one the relocation item 154, step 312. Typically, relocation items 154 are also fetched in sequential order. XIP_Linker 78'a then examines the relocation item information described earlier and cumulates the relevant information, i.e. number of restructurable relocation items 172, number of selector relocation items 174 etc., step 313. After processing the relocation items 154, XIP_Linker 78'a determines if there are more relocation items 154, step 314. If there are more relocation items 154, XIP_Linker 78'a repeats steps 312 and 313 until all relocation items 154 are processed. After all relocation items 154 for the located segment 102b–102d have been processed, XIP_Linker 78'a determines if the "RAM based" application 62' has more segments 102b–102d. If more segments 102b–102d are still to be processed, XIP_Linker 78'a repeats steps 307–314, until all segments 102b–102d have been processed.

Figure 10:
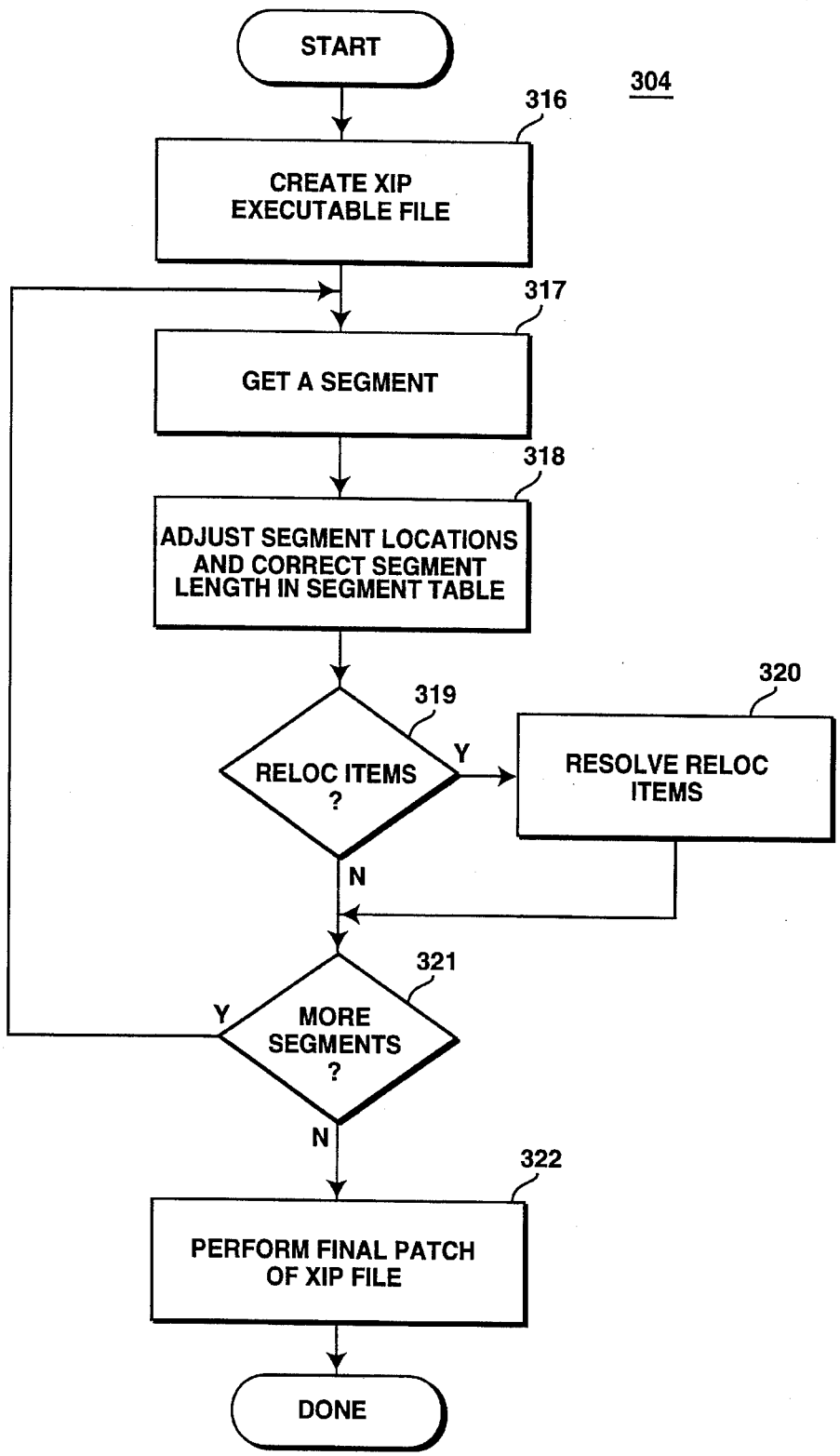
FIG. 10 illustrates the "generate XIP application" step of FIG. 8 in further detail.
Figure 11A:
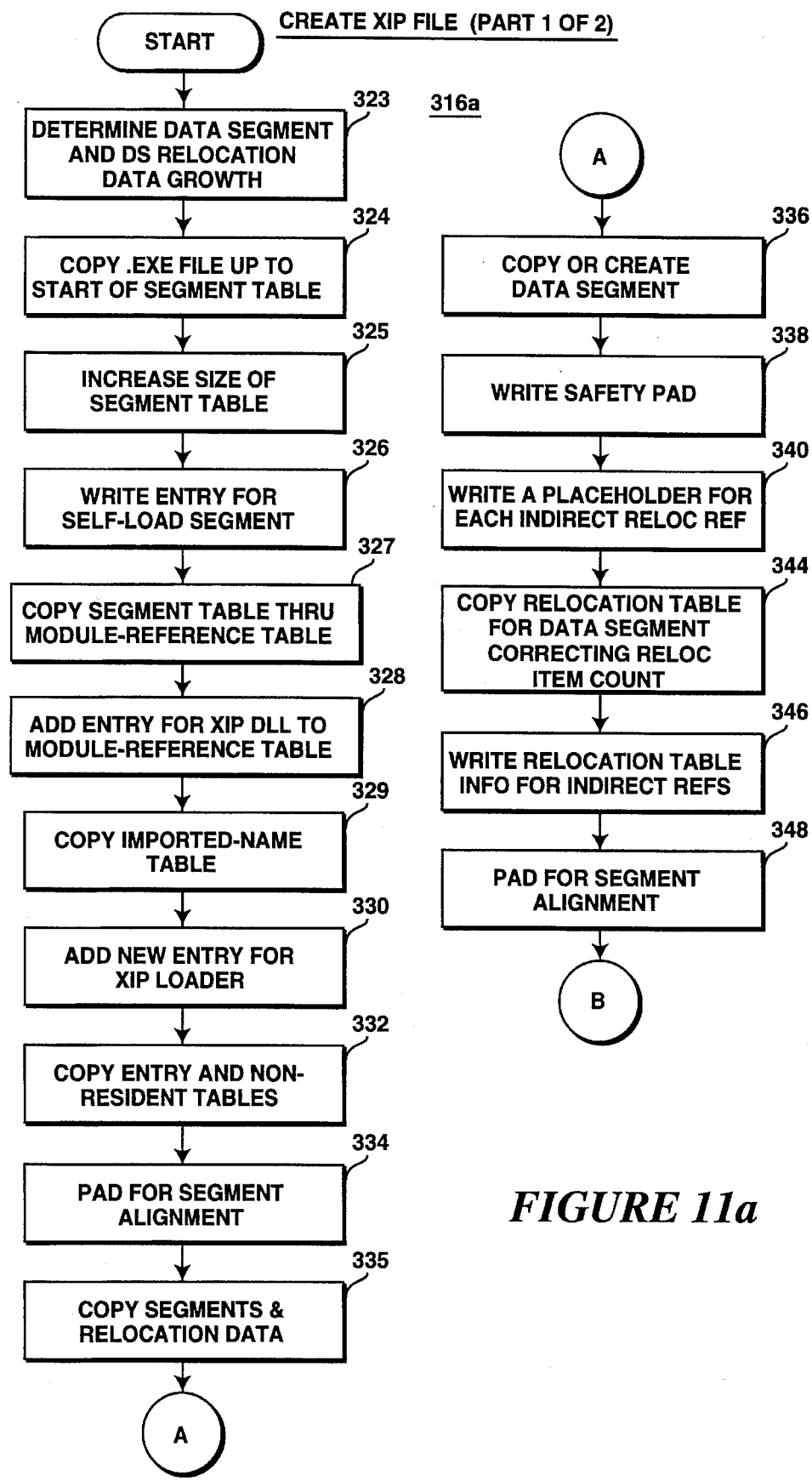
FIGS. 11a–11b illustrate the "create XIP file" step of FIG. 10 in further detail.
Figure 11B:
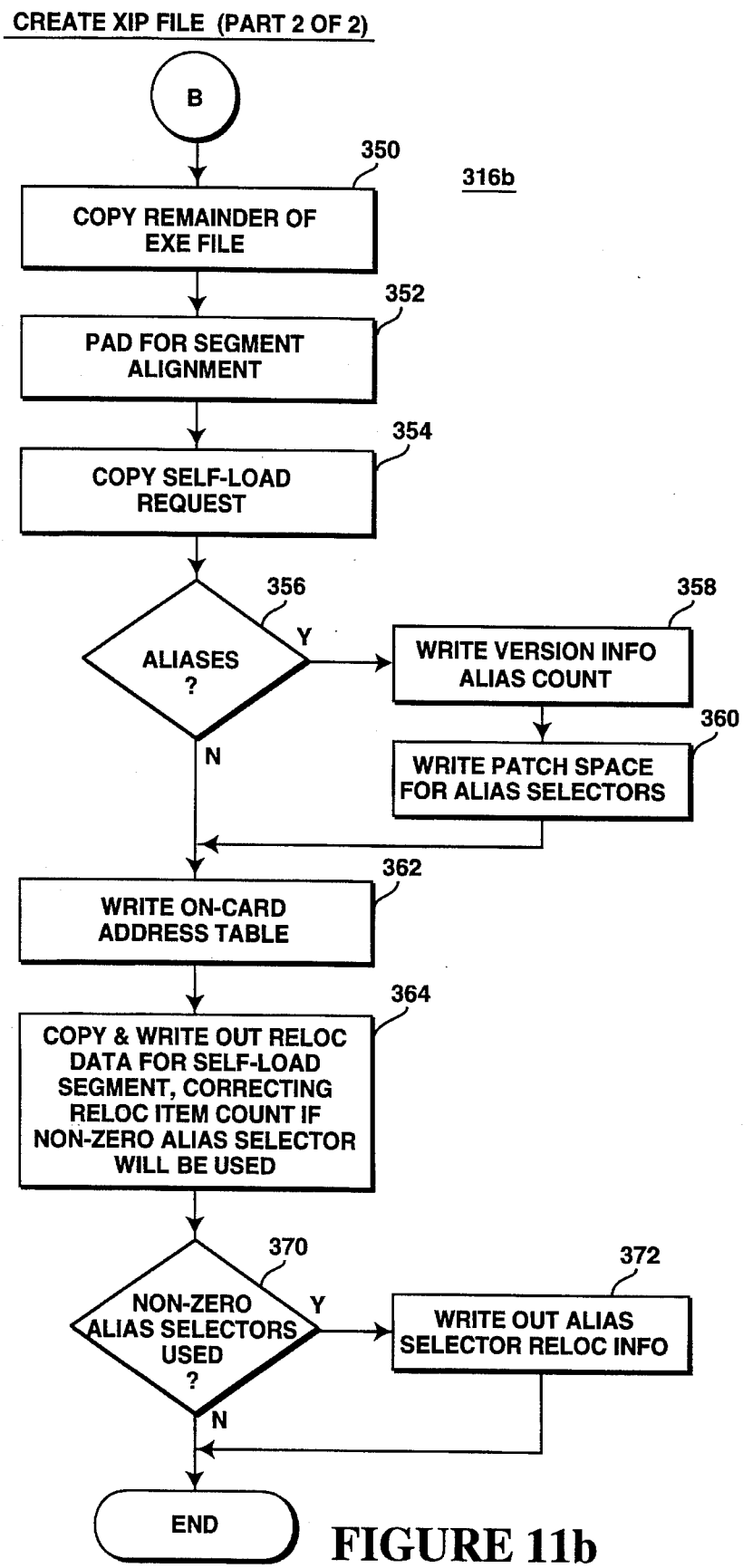

FIG. 10 illustrates "XIP application generation" step 304 in further detail. As shown, XIP_Linker 78'a first creates the new XIP executable file 64', step 316. Skipping now to FIGS. 11a–11b which illustrate step 316 in further detail, XIP_Linker 78'a first determines the segment size and relocation data growth for the automatic R/W data segment 106d, using the information recorded in working segment information table 164, step 323. XIP_Linker 78'a then copies "RAM based" application's executable file 62' up to the start of the segment table 110a–110e into the new XIP executable file 64' being generated, step 324. XIP_Linker 78'a further increases the size of the segment table 112a, step 325, writes out a segment entry for self-load segment 78'b, step 326, and copies segment table 112a into XIP executable file 64', step 327. XIP_Linker 78' further copies resource and module reference tables 112b–112c into XIP executable file 64', step 327, and adds an entry for XIP_LOADER 84' to module reference table 112c, step 328. XIP_Linker 78' further copies imported-name table 112d into XIP executable file 64', step 329, and adds an entry for XIP_LOADER 84' to imported-name table 112d, step 330. XIP_Linker 78' further copies entry and non-resident tables 112e–112f into XIP executable file 64', step 332, pads for segment alignment, step 334, and copies segments and relocation data 116 into new XIP executable file 64', step 335.

Next, XIP_Linker 78'a either copies automatic R/W data segment 118s into XIP executable 64' or creates automatic R/W data segment 119a directly, step 336. XIP_Linker 78'a preferably further writes out a safety pad 115c, step 338. XIP_Linker 78'a further writes out a place holder for each indirect reference to be created, step 340, copies the relocation data 110c for automatic R/W data segment 102c into the XIP executable file 64' correcting the relocation item count 152, step 344, writes out relocation items for the indirect references, step 346, and pads for segment alignment, step 348. Then, XIP_Linker 78' copies the rest of "RAM based" application executable file 62' into XIP executable file 64', step 350, and pads for segment alignment, step 352.

Next, XIP_Linker 78'a copies self-load segment 78'b into XIP executable file 64', step 354. XIP_Linker 78' then determines if any of the predetermined range segment selectors 83' will be aliased to dynamically allocated segment selectors 85' during execution, step 356. If one or more of the predetermined range segment selectors 83' will be aliased, XIP_Linker 78'a writes out version information and alias count 126, step 358 and patch spaces for alias selectors 127, step 360.

Next, regardless whether any of the predetermined range segment selectors 83' will be aliased, XIP_Linker 78'a writes out "on card" address table, step 362. XIP_Linker 78'a then copies relocation data 120d of self-load segment 78'b into XIP executable file 64' correcting relocation count 152 if any of the predetermined range segment selectors 83' will be aliased, step 364. Lastly, XIP_Linker 78'a writes out alias relocation data items 154 for the aliases if applicable, steps 366–368.

Referring now back to FIG. 10 where the "XIP application generation" step 304 is illustrated, upon creating XIP executable file 64', step 316, XIP_Linker 78'a gets a segment 106b–106d, step 317. Typically, segment 106b–106d are fetched in sequential order. XIP_Linker 78'a adjusts segment locations within the fetched segment 106b–106d and corrects segment length information in segment table 117, step 318.

Next, XIP_Linker 78'a determines if the fetched segment 106b–106d has relocation items 154, step 319. If the fetched segment 106b–106d has relocation items 154, XIP_Linker 78'a resolves the relocation items, step 320, which will be described in more detail below. Upon resolving the relocation items 154, XIP_Linker 78'a determines if there are more segments 106b–106d to be processed, step 321. If there are more segments 106b–106d to be processed, XIP_Linker 78'a repeats steps 317–320 repeatedly, until all segments 106b–106d have been processed.

Lastly, having resolved all relocation items 154 in all segments 106b–106d, XIP_Linker 78'a performs final patches to the XIP executable file 64', which will be described in more detail below also.

Figure 12A:
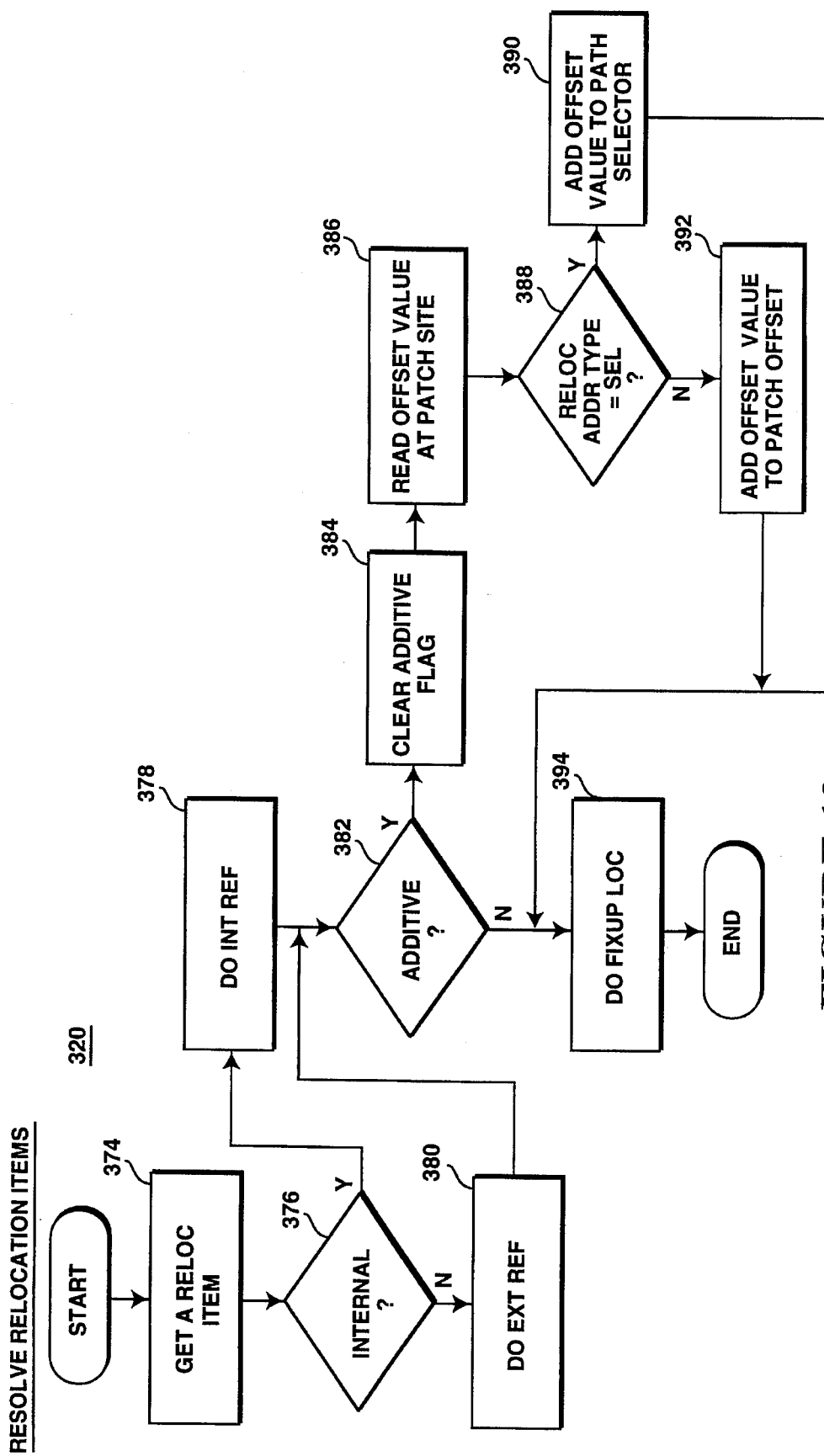
FIGS. 12a–12c illustrate the "resolve relocation items" step of FIG. 10 in further detail.
Figure 12B:
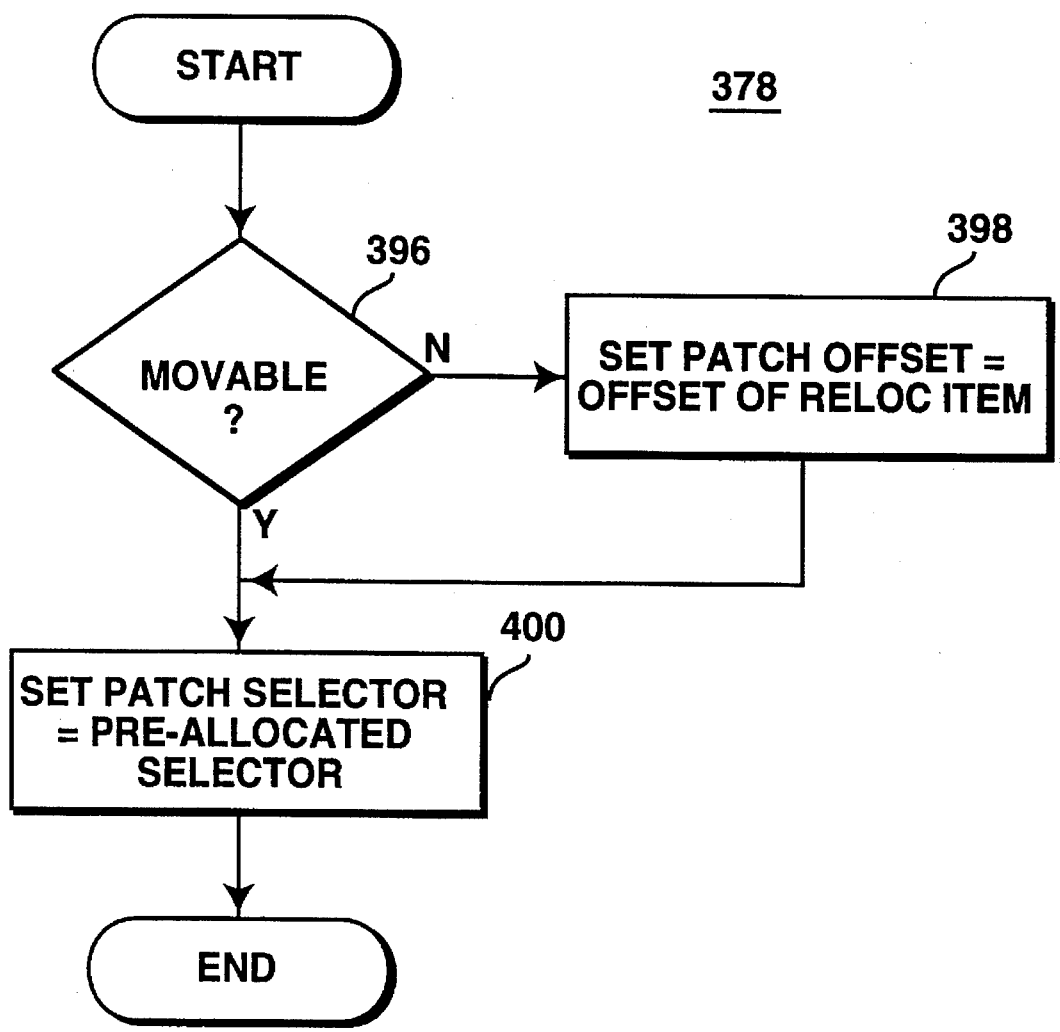
Figure 12C:
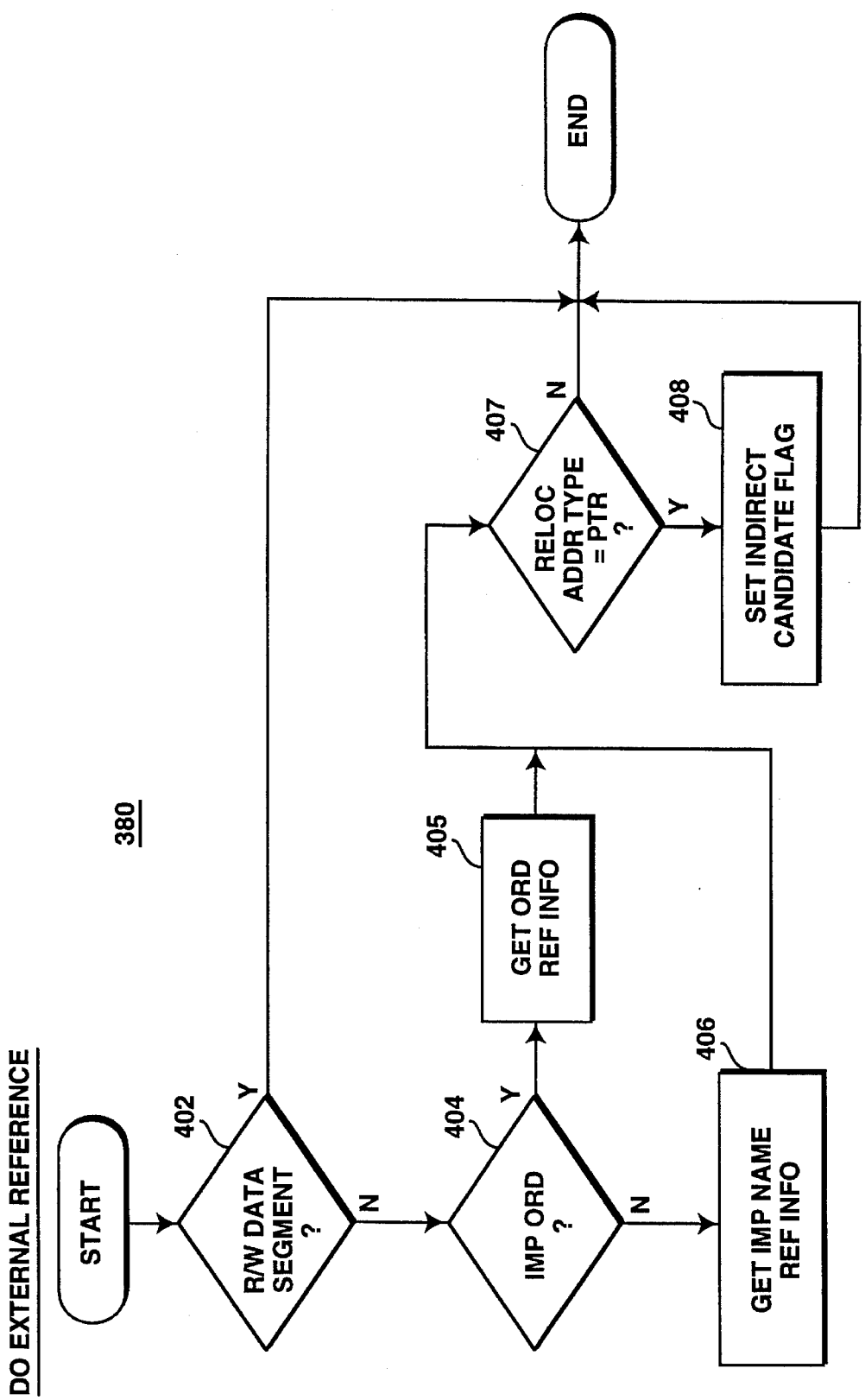

FIGS. 12a–12c illustrate the "resolving relocation items" step 320 in further detail. As shown, XIP_Linker 78'a gets a relocation item 154 of the located segment 106a–106d, step 374. As described earlier, typically, relocation items 154 are fetched in sequential order. XIP_Linker 78'a then determines if the relocation item 154 is associated with an internal reference, step 376. If the relocation item 154 is associated with an internal reference, XIP_Linker 78'a resolves it accordingly, step 378, otherwise, XIP_Linker 78'a resolves the relocation item 154 as an external reference, step 380.

Skipping now to FIGS. 12b–12c where steps 378 and 380 are illustrated in further detail. For an internal reference, XIP_Linker 78'a determines if the referenced segment is movable, step 396. If the referenced segment is not movable or fixed, XIP_Linker 78'a sets a patching offset to the offset 162 specified by the relocation item 154, step 398. Regardless whether the referenced segment is movable, XIP_Linker 78'a sets the patching selector 196 to the segment's preallocated selector 83' specified in the relocation item 154 in the case of non-movable referenced segment or looks up in the segment table 113a using the ordinal value specified 162 specified in the relocation item 154 in the case of movable referenced segment, step 400.

For an external reference, XIP_Linker 78'a determines if the located segment 106a–106d is the automatic R/W data segment 106d, step 402. If the located segment is the automatic R/W data segment 106d, XIP_Linker 78'a takes no further action. The relocation item 154 will be resolved in the conventional manner by Windows' kernel 66' when it is invoked by XIP_LOADER 84' to allocate RAM to the automatic R/W data segment 106d. On the other hand, if the located segment 106a–106d is not the automatic R/W data segment 106d, XIP_Linker 78'a resolves the external references with either the ordinal value or the name of a function from the module's reference table 113c retrieved using the specified index 162 into the module reference table 113c, steps 404–406. Additionally, if the relocation item has the pointer address type 156, step 407, XIP_Linker 78'a further sets the indirect candidate flag 198 denoting the relocation item 154 as a restructurable external reference candidate, step 408.

Referring now back to FIG. 12a, upon processing the internal/external reference, XIP_Linker 78'a determines if the additive flag in relocation reference type 158 is set for the relocation item 154, step 382. If the additive flag in relocation reference type 158 is set, XIP_Linker 78'a clears the additive flag, step 384, reads the offset value at the specified patch site 160, step 386, and adds the offset value read to either the patching selector or offset depending on whether the relocation item's address type 156 is the selector address type, steps 388–392. Lastly, regardless whether the additive flag is set, XIP_Linker 78'a fixes up the applicable locations, step 394.

Figure 13A:
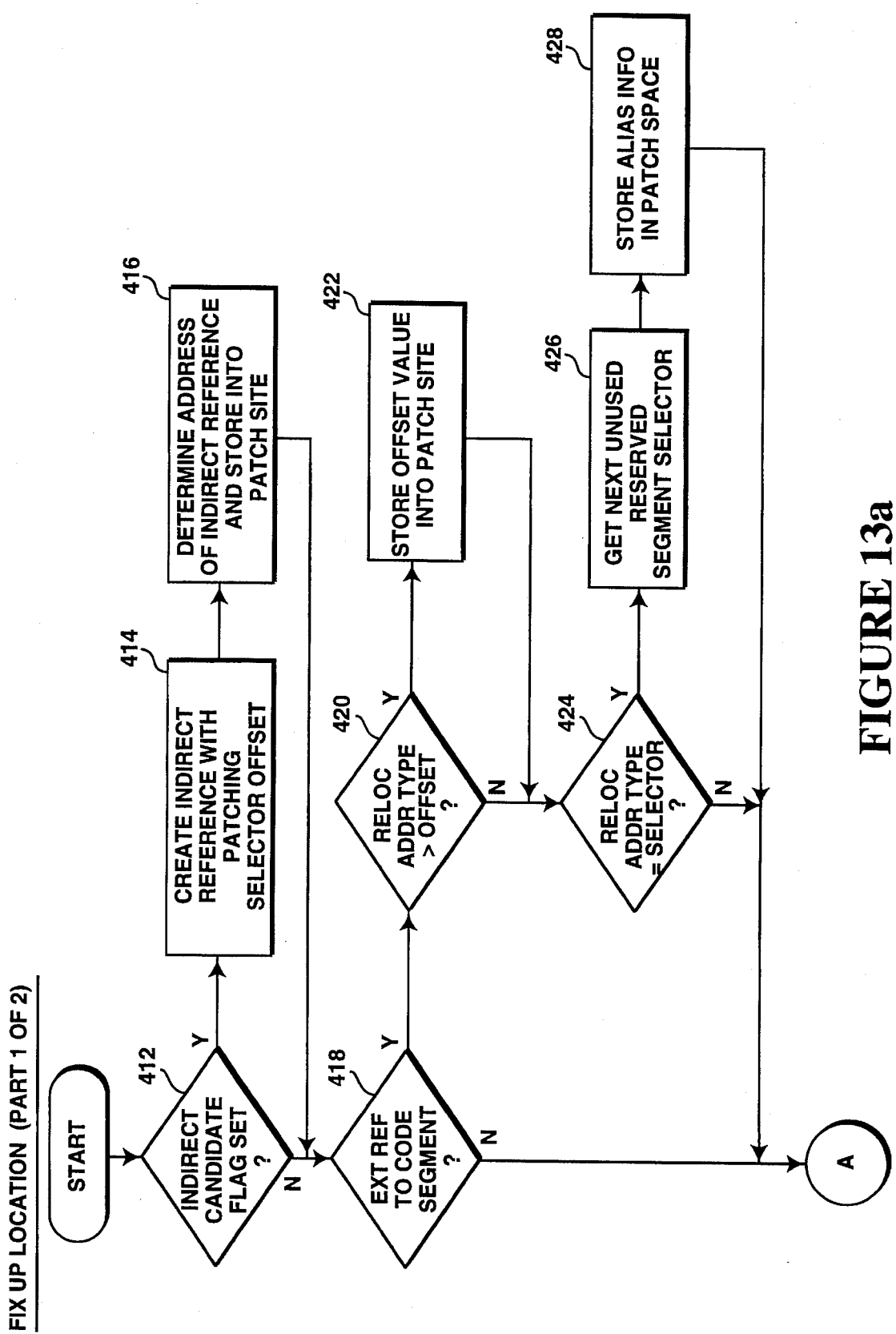

FIGS. 13a–13b illustrates "fix up location(s)" step 394 in further detail. As shown, XIP_Linker 78'a determines if the indirect external reference candidate flag is set, step 412. If the indirect external reference candidate flag is set, XIP_Linker 78'a creates an indirect reference 125 with the patching selector and offset values 196–197. XIP_Linker 78'a determines the address of the created indirect reference 125 and stores the address into the patch site, step 416. If the indirect external reference candidate flag is not set, XIP_Linker 78'a further determines if the external reference is to a code segment, step 418. If the external reference is to a code segment and the relocation address type 156 is the offset type, XIP_Linker 78'a stores the offset value into the patch site, steps 420–422. However, if the external reference is to a code segment and the relocation address type 156 is the selector type, XIP_Linker 78'a uses one of the predetermined range of segment selector 83' to alias the real selector to be dynamically allocated by Windows' kernel 66', steps 424–426. If step 426 is performed, XIP_Linker 78'a further stores the alias and alias information into the patch space for alias selectors 127 and relocation data for aliases 129 respectively, step 428.

If the external reference is not to a code segment, XIP_Linker 78'a performs steps 430–454 for all patch sites in the patch site chain. XIP_Linker 78'a first determines if end of chain has been reached, step 430. End of chain is reached if the additive flag of the relocation type 158 of a relocation item 154 is set or a predetermined offset value (such as xFFFF) has been read from a patch site. If end of chain has not been reached, XIP_Linker 78'a reads the opcode and the value at the patch site, steps 432–434. Next, XIP_Linker 78'a determines if the additive flag of the relocation type 158 of the relocation item 154 was set, step 438. If the additive flag was set, XIP_Linker 78'a notes that end of chain has been reached, step 440, before proceeding with steps 442–454.

At steps 442–444, XIP_Linker 78'a conditionally overrides the preceding byte of the patch site with the indirect FAR CALL opcode and notes that the original FAR CALL is to be removed if the address type of relocation item 154 is the pointer address type and associated with a FAR CALL instruction. At steps 446–448, XIP_Linker 78'a conditionally creates an alias selector and stores the alias and the alias information as described earlier if the address type of relocation item 154 is the pointer address type but not associated with a FAR CALL instruction.

At step 450, XIP_Linker 78'a writes to the patch site accordingly depending on a number of considerations. If the relocation address type 156 is the selector type, XIP_Linker 78'a writes the patching selector value into the patch site. If the relocation address type 156 is the offset type, XIP_Linker 78'a writes the patching offset value into the patch site. If the relocation address type 156 is the pointer type and associated with a FAR Call, XIP_Linker 78'a writes the patching offset value into the patch site. If the relocation address type 156 is the pointer type and not associated with a FAR Call, XIP_Linker 78'a writes the patching selector and offset values into the patch site.

Lastly, at steps 452–454, XIP_Linker 78'a conditionally removes the relocation item 154 if the relocation item 154 is an internal reference. XIP_Linker 78'a then returns to step 430.

Figure 14:
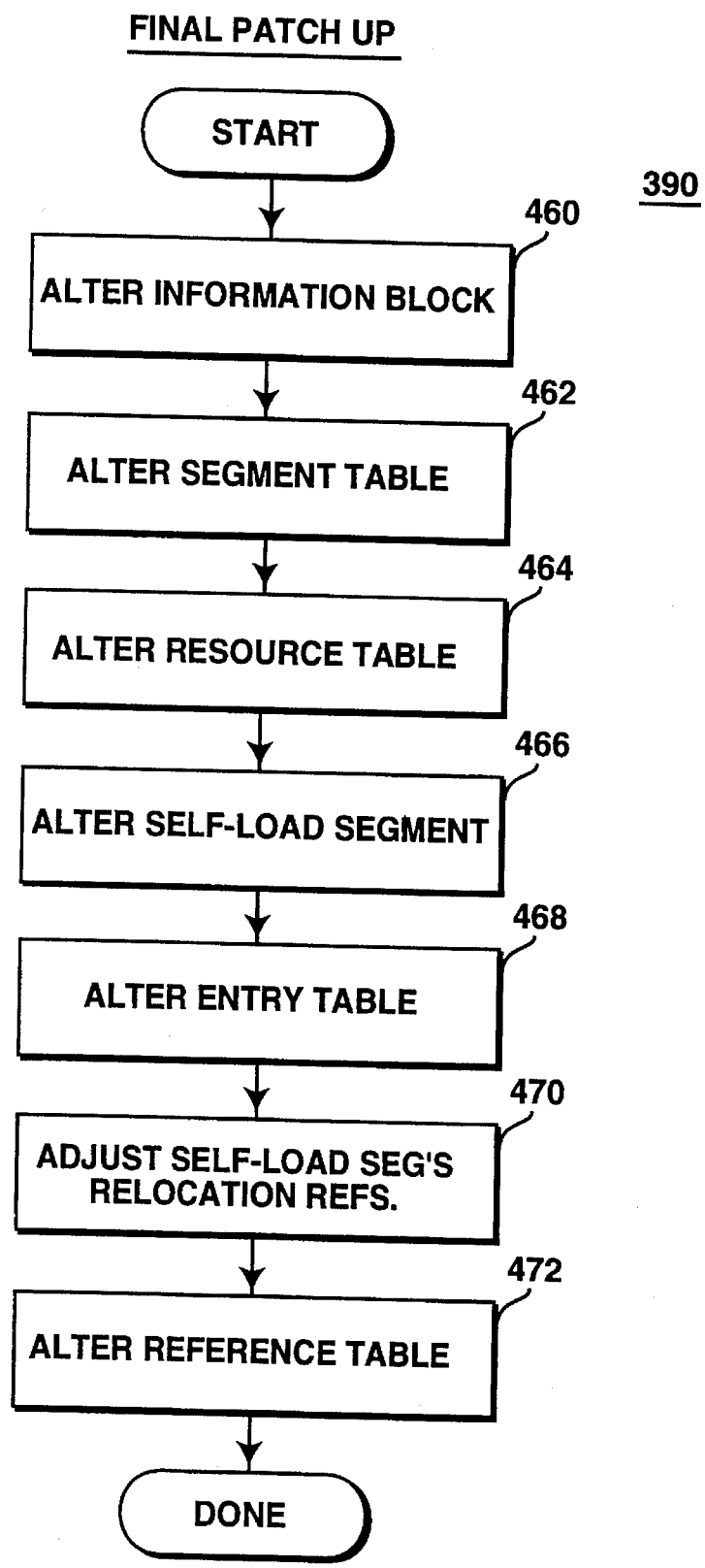
FIG. 14 illustrates the "final patch" step of FIG. 10 in further detail.

FIG. 14 illustrates the "final patch up" step 390 in further detail. As shown, XIP_Linker 78'a first corrects the information block 111e, step 460. All fast load fields in the information block 111e are cleared and the number of segment entries in the information block 111e is increased by one to account for the new self load segment 119d. The original code segment:instruction pointer (CS:IP) pair in the information block 111e is stored in a predetermined location of the self-load segment 119d for later use at execution time, and the CS:IP field of the information block 111e is set to the entry point of the self-load segment 119d. All entries in the information block 111e that have segment numbers are incremented by one to accommodate the new self-load segment 119d. The pointers to the header tables in the information block 111e are adjusted to account for the new entry in the segment table 113a, the module-reference table 113b, and the name table growth. Lastly, the self-load flag in the information block 111e is set.

Next, XIP_Linker 78'a corrects the segment table 113a, step 462. The entry for the automatic R/W data segment in the segment table 113a is adjusted to account for its increase in size and its minimum allocation size is also increased. A flag in the entry is set to indicate that the automatic R/W data segment 119a has relocation references 121a. Similar flags in other entries for the other segments 119b–119c are set to denote these other segments 119b–119c do not have relocation references 121b–121c, and the corresponding relocation counts in these entries are set to zero. The entry for the self-load segment 119d is adjusted so that its offset, length, and flags are correct.

XIP_Linker 78'a then corrects the resource table 113b, step 464, such that it identifies the new locations of all the resources in the XIP executable file 64'. XIP_Linker 78'c further corrects the self-load segment 119d, step 466. The CS:IP location stored in the information block 111e is written to a specific location in the self-load segment 119d. This specific location is used when the self-load segment 106d is executed to transfer control to the XIP application 64'. XIP_Linker 78'c further corrects entry table 113e, step 468. XIP_Linker 78'c loops through entry table 113e checking the type segment referred to. If an entry refers to a moveable segment, its segment number is incremented by one to accommodate the new self-load segment 119d. Then, if the entry is exported, the entry point is examined. If the code for PUSH DS, POP AX or MOV AX, DS is found, XIP_Linker 78'a patches the entry point with two NOP instructions. This patching duplicates what Windows' kernel 66' (loader) does when loading an application. Similarly, if an entry refers to a fixed segment, its segment number is also incremented by one to accommodate the new self-load segment 119d. Again, if the entry is exported, the entry point is examined. If the code for PUSH DS, POP AX or MOV AX, DS is found, XIP_Linker 78'a also patches the entry point with two NOP instructions. On the other hand, if an entry refers to a constant defined in a module, XIP_Linker 78'a takes no further action.

XIP_Linker 78'a then corrects relocation data 121d of the self-load segment 119d to account for the new reference to XIP_LOADER 84', step 470. Lastly, XIP_Linker 78'a corrects module reference table 113c such that it points to the beginning of the name of XIP_LOADER 84' in the imported name table 113d, step 472.

Figure 15:
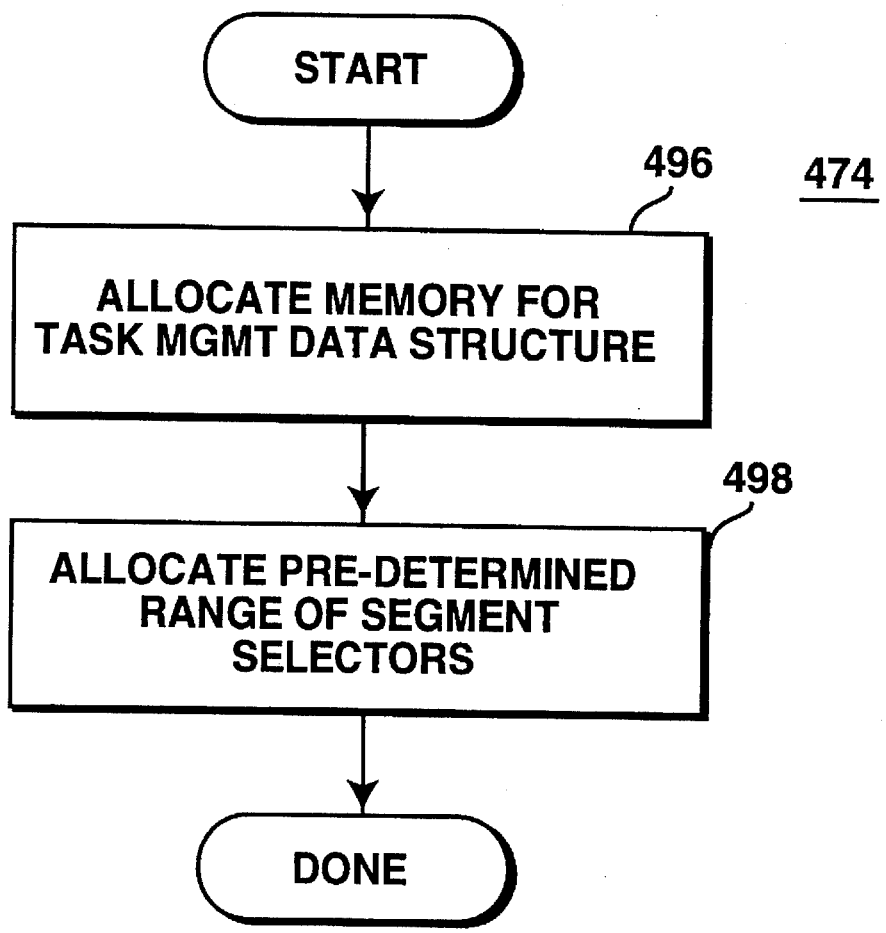
FIG. 15 illustrates the operational steps performed at system initialization time by one embodiment of XIP_Mgmt.

FIGS. 15–17, 18a–18c, and 19–21 illustrate the operating steps at system initialization, Windows' start up, XIP application "load", task start, task in, task out, and task stop time performed by the various runtime elements. As shown in FIG. 15, at system initialization time, upon being given control, XIP_Mgmt 78'a allocates RAM for task management data structure 87', step 476, then causes the predetermined range of segment selectors 83' to be allocated to itself, step 478. As described earlier, XIP_Mgmt 78'a repeatedly requests Windows' kernel 66' to allocate segment selectors to XIP_Mgmt 78'a until the predetermined range of segment selectors 83' are allocated. XIP_Mgmt 78'a then releases the allocated segment selectors 83' outside the predetermined range.

Figure 16:
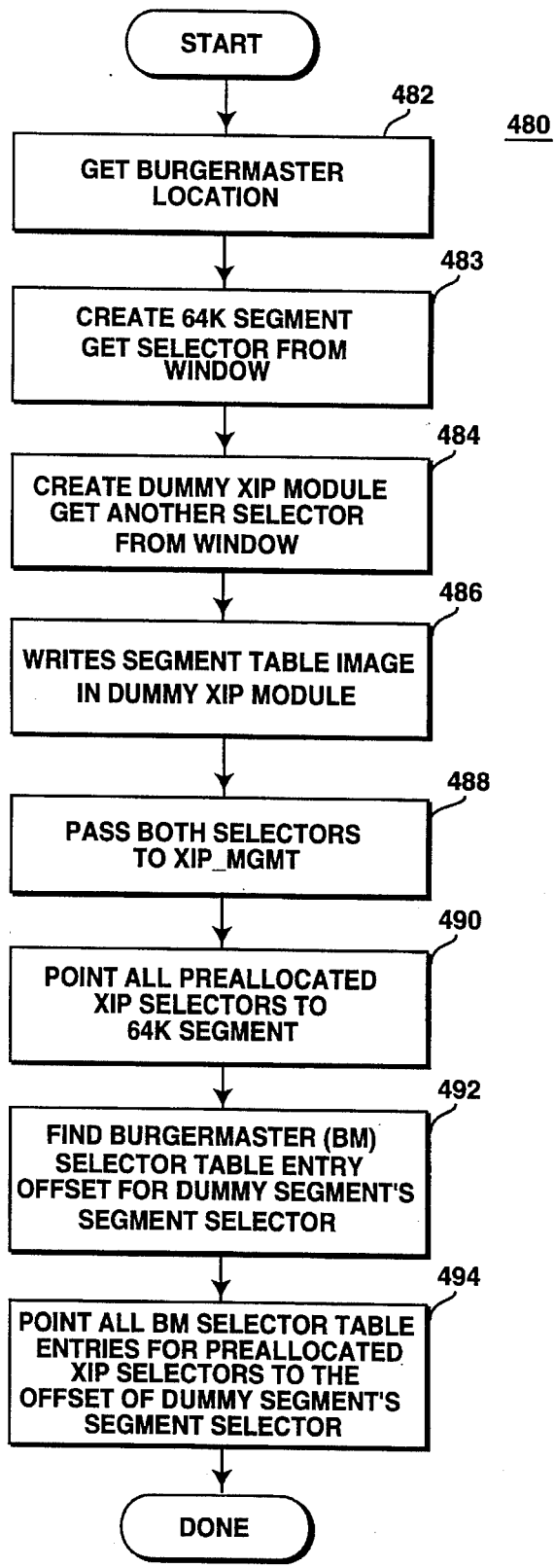
FIG. 16 illustrates the operational steps performed at Windows™ start up time by one embodiment of complementary XIP_Init and XIP_Mgmt.

As shown in FIG. 16, at Windows™ start up time, upon being given control, XIP_Init 78'b obtains from Windows' kernel 66' the location of Burgermaster segment 81'a, step 482. XIP_Init 78'b then creates a dummy segment 106e, preferably 64K and causes Windows' kernel 66' to allocate a segment selector 81'b for the dummy segment, step 483. XIP_Init 78'b further creates a dummy module using the dummy segment 106e and obtains another segment selector 85' from Windows' kernel 66', step 484. XIP_Init 78'b further writes a segment table image into the dummy module, step 486.

Next, XIP_Init 78'b informs XIP_Mgmt 78'a of both segment selectors 85', step 488. In response, XIP_Mgmt 78'a fixes up the segment descriptors of all segment selectors 83' within the predetermined range to point to the dummy segment 106e, step 490. Then, XIP_Mgmt 78'a determines Burgermaster's selector table entry offset for dummy segment 106e, step 492. Lastly, XIP_Mgmt 78'a points all Burgermaster selector table entries for the predetermined range of segment selectors 83' to the offset of dummy segment's segment selector 85'.

The above steps are performed to address certain runtime behavior of Windows™, in particular, to ensure certain runtime checking performed by Windows™ will still pass, notwithstanding the novel usage of the pre-allocated predetermined range of segment selectors 83'.

Figure 17:
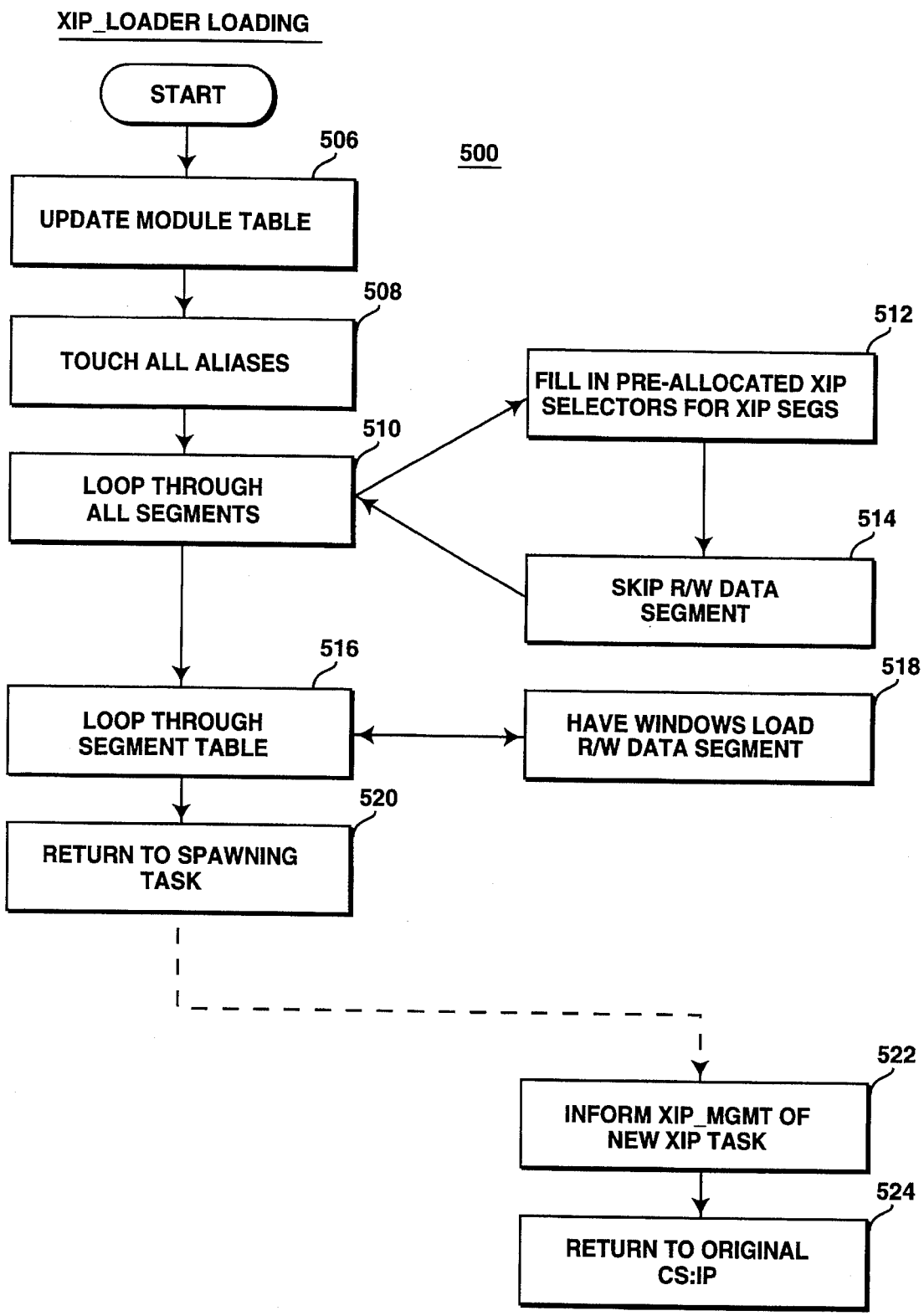
FIG. 17 illustrate the operational steps performed at XIP application "load" time by the XIP_Loader.

As shown in FIG. 17, at XIP application "load" time, upon receiving control from the self-load segment 106a as described earlier, XIP_LOADER 84' updates the module table for XIP application 64', step 506. (XIP_LOADER 84' also "registers" itself with TOOLHELP for task switching notifications when it is invoked the first (step not shown)). XIP_LOADER 84' then touches all aliases causing all "load on call" and "load on demand" segments and the segment descriptors of their selectors to be loaded into memory by Windows' kernel 66'. XIP_LOADER 84' then loops through the segment table of the module table, filling in the pre-allocated pre-determined range of segment selectors 83' for all segments except the automatic R/W data segment, steps 510–514. XIP_LOADER 84' then loops through the segment table of the module table again, causing Windows' kernel 66' to allocate RAM to automatic R/W data segment 106d, assigns a segment selector 85' to automatic R/W data segment 106d, fixes up the segment descriptors of the assigned segment selector 85' and resolves any relocation items 154 of automatic R/W data segment 106d, steps 516–518. Steps 516–518 are performed after steps 510–514 to enable Windows' kernel 66' to be able to properly resolve any relocation items 154 of automatic R/W data segment 106d.

Next, XIP_LOADER 84' returns to Windows' loader to complete task spawning of XIP application 64'. In response, Windows' kernel 66' places the XIP application's handle on the task queue. In due course, self-load segment 106a is given control again. As a result of the CS:IP fix up in self-load segment 106a described earlier, execution control is immediately transferred back to XIP_LOADER 84'. XIP_LOADER 84' then informs XIP_Mgmt 82'a of task start up, and continues execution at the original CS:IP, steps 522–524.

Figure 18A:
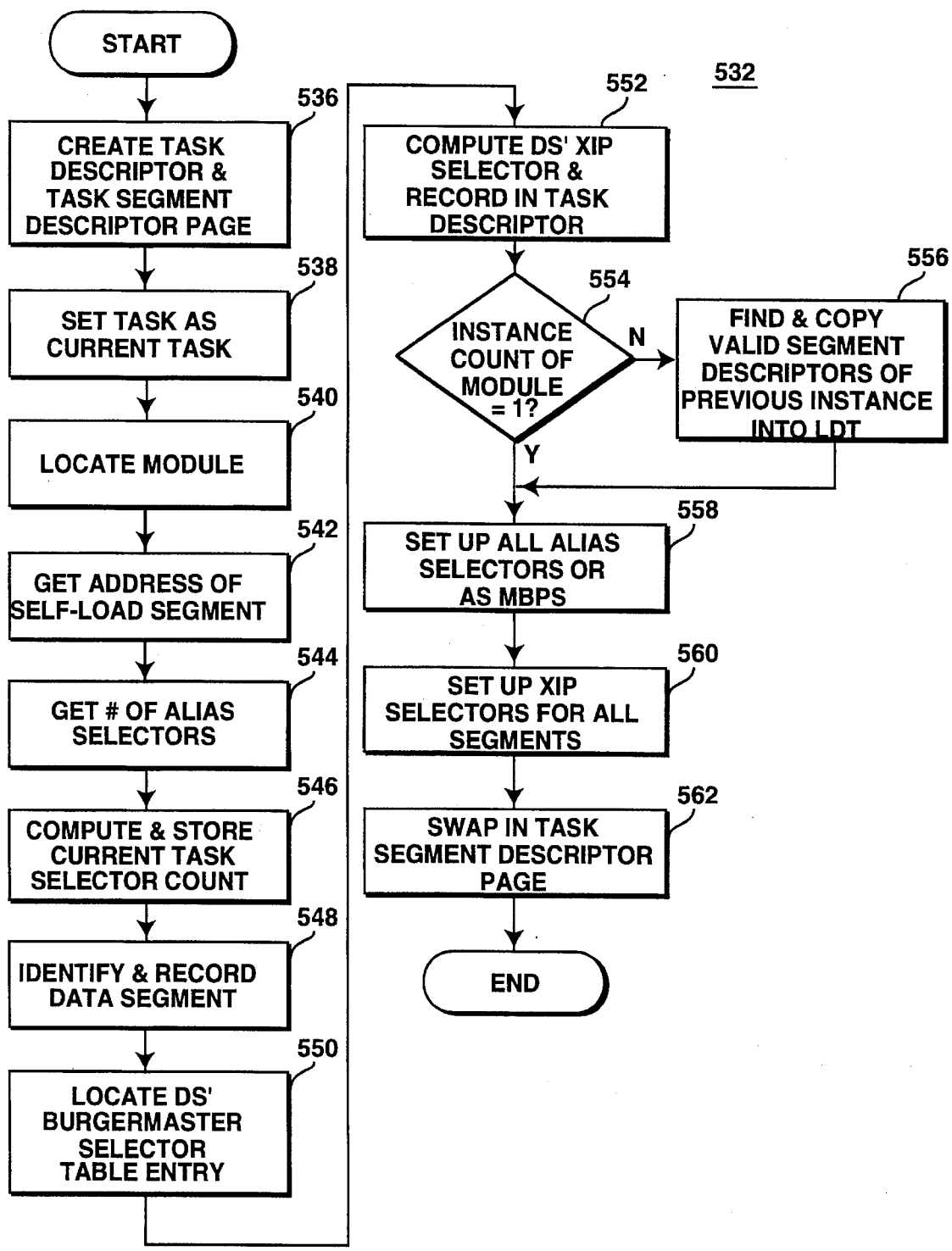
FIGS. 18a–18c, 19–21 illustrate the operational steps performed at task start-up, task in, task out, and task termination time by one embodiment of XIP_Mgmt.
Figure 18B:
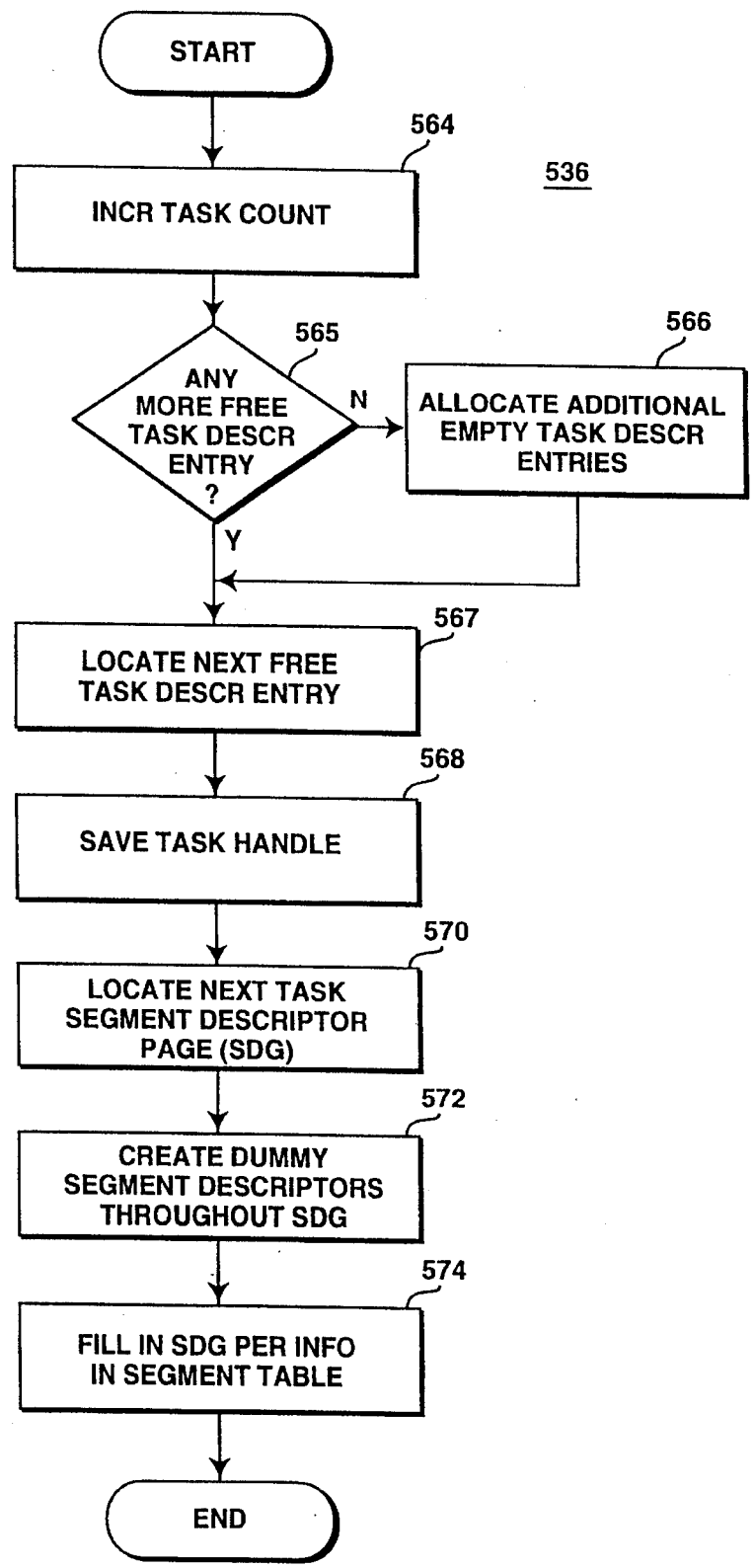

As shown in FIGS. 18a, at task start up time, upon being notified by XIP_LOADER 84', XIP_Mgmt 82'a creates task descriptor 204 and the corresponding task segment descriptor page 206, step 206. FIG. 18b illustrates step 206 in further detail. XIP_Mgmt 82'a first increments task count 210, step 564. XIP_Mgmt 82'a then determines if there are any free task descriptor entries 204, step 565. If there are no free task descriptor entries 204, XIP_Mgmt 82'a allocates more free task descriptor entries 204 and corresponding task segment descriptor pages 206, step 566. Upon determining there are free task descriptor entries 204 or creating new ones, XIP_Mgmt 82'a then locates the next free task descriptor entry 204 in task management data structure 89', and saves the starting task's handle into the entry, steps 567–568. XIP_Mgmt 82'a then locates the corresponding free task segment descriptor page 206, and creates dummy segment descriptors throughout the newly allocated task segment descriptor page 206, steps 570–572. Lastly, XIP_Mgmt 82'a fills in the segment descriptor page 206 based on the information in the segment table of module table, step 574.

Referring back to FIG. 18a, upon creating task descriptor 204 and corresponding task segment descriptor page 206, XIP_Mgmt 82'a sets the starting task as the current task, step 538. XIP_Mgmt 82'a locates the module, step 540, and gets address of self-load segment 106a and number of alias selectors, steps 542 and 544. XIP_Mgmt 82'a then computes and stores the selector count 216, step 546. XIP_Mgmt 82'a also identifies and records the current task's automatic R/W data segment 106d in identifier 218, step 548. Next, XIP_Mgmt 82'a locates Burgermaster's selector table entry, step 550, computes and stores the automatic R/W data segment's "XIP selector", i.e. the "alias selector" in the predetermined range of segment selectors 83'. XIP_Mgmt 82'a further determines whether the instance count for the module equals 1, step 554. If the instance count is not equal to 1, XIP_Mgmt 82'a finds and copies valid segment descriptors of previous instances into Windows' LDT before proceeding to step 558.

Either case, at step 558, XIP_Mgmt 82'a either resolves the alias selectors 83' to their true dynamically allocated selectors 85' or fixes up the alias selectors 83' as meaningful bad pointers or MBPs. MBPs are created by placing the real segment selector number into the base portion 54 of the segment descriptor 46 of the particular one of the pre-allocated pre-determined range of segment selectors 83' and marks the segment descriptor 46 as TSS. Since accessing a TSS descriptor will generate an memory general protection fault, control may be transferred in this manner to XIP_Init 82'b. Lastly, XIP_Mgmt 82'a sets up the predetermined range of selectors for all segments, step 560, and swaps in the current task's task segment descriptor page 206, step 562.

Figure 18C:
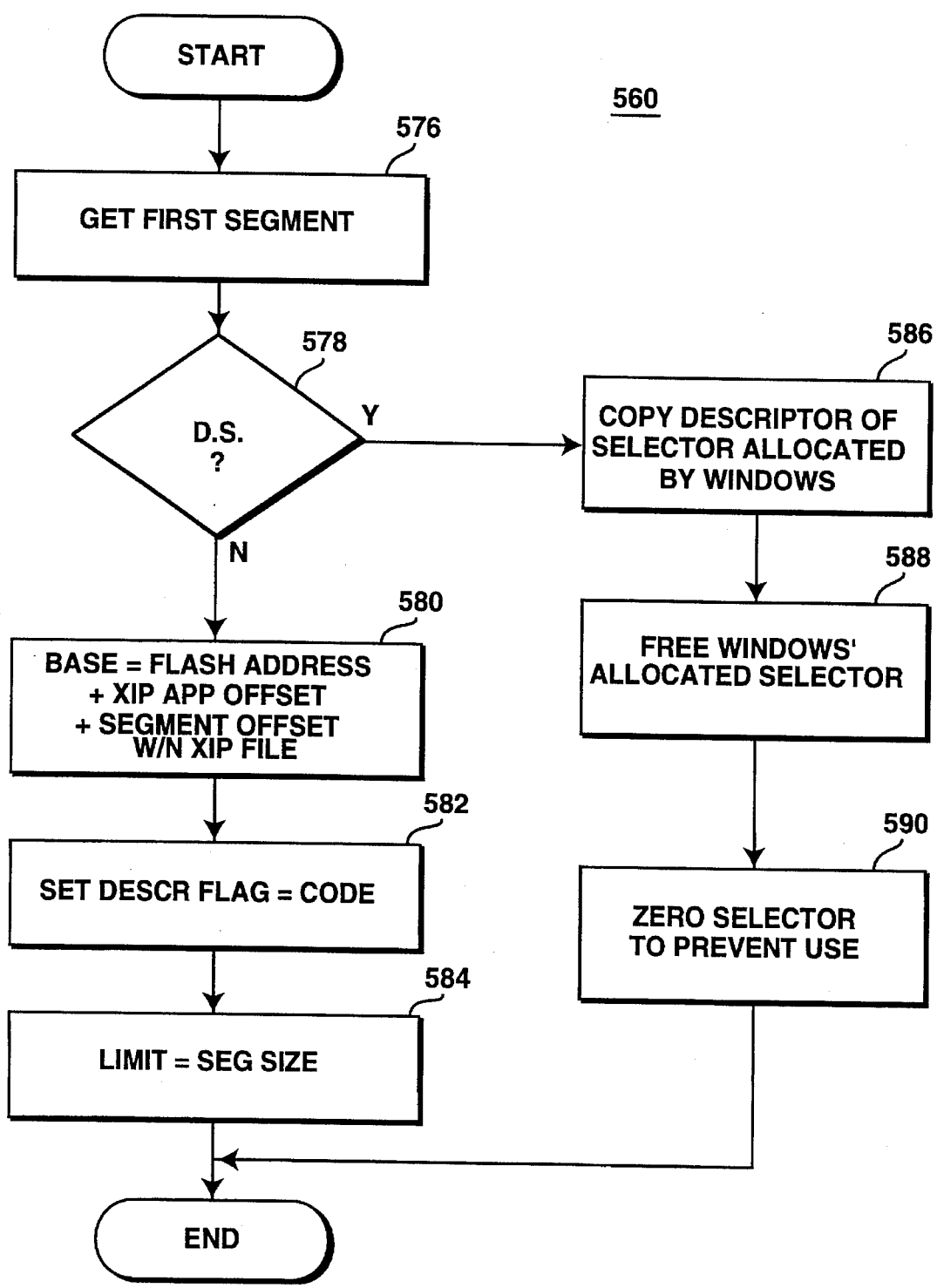

FIG. 18c illustrates step 560 in further detail. XIP_Mgmt 82'a gets the first segment 106a–106d, step 576. Typically, the segment 106a–106d is obtained in sequential manner. Next, XIP_Mgmt 82'a determines if the segment 106a–106d is automatic R/W data segment 106d. If it is not automatic R/W data segment 106d, XIP_Mgmt 82'a sets the base field to the sum of the flash memory address, XIP application's offset, and segment offset within the executable file, step 580, sets the descriptor flag to "Code", step 582, and sets the limit to "segment size", step 584. On the other hand, if the located segment is automatic R/W data segment 106d, XIP_Mgmt 82'a copies the segment descriptor information of the segment selector 35' allocated by Windows' kernel 66', step 586. Preferably, XIP_Mgmt 82'a further frees the Windows allocated selector, step 588, and zeros out the segment selector to prevent its reuse, step 590.

Figure 19:
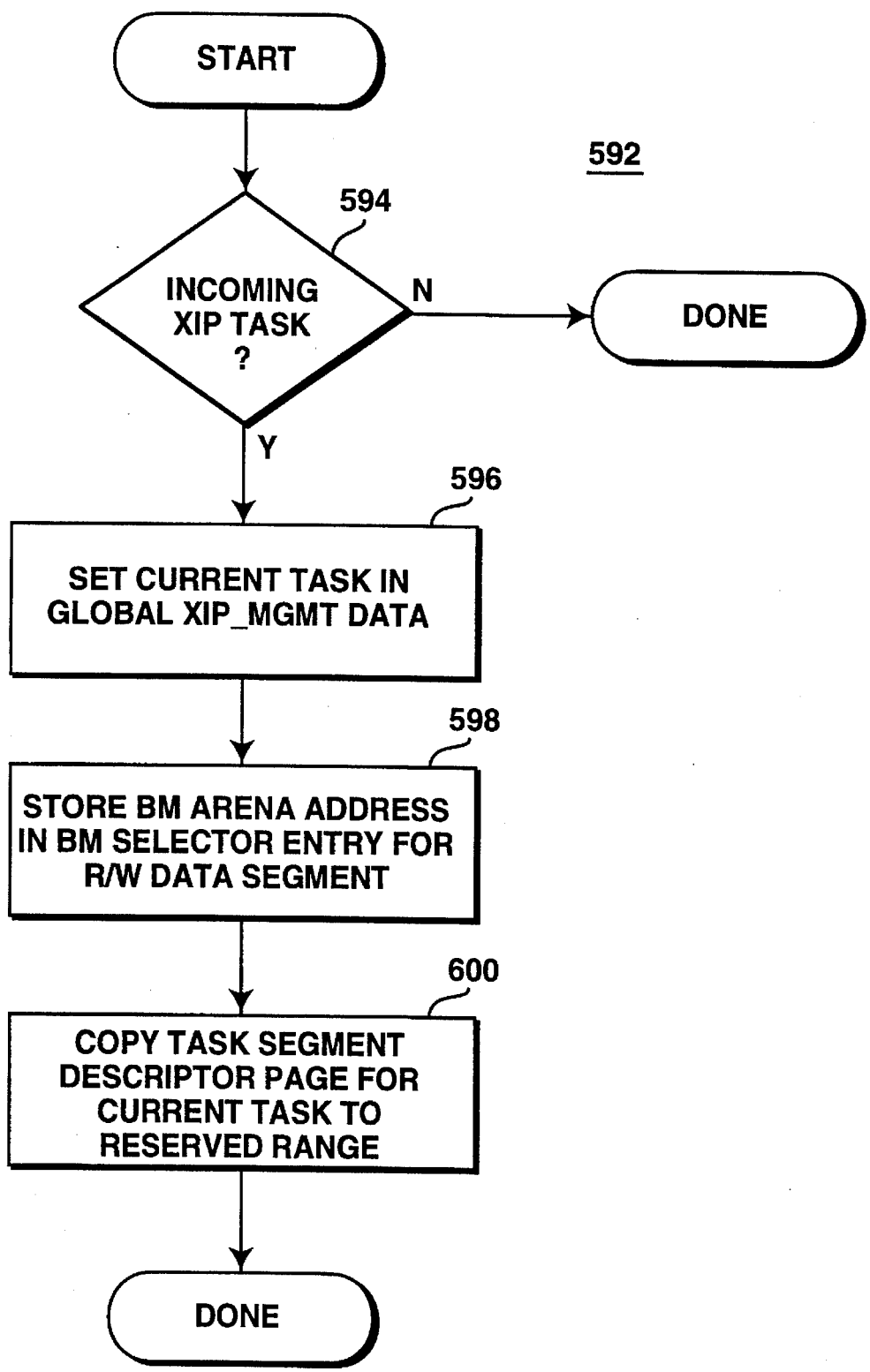

As shown in FIG. 19, at task in time, upon being notified by XIP_LOADER 84', XIP_Mgmt 82'a determines if the incoming task is an XIP task, step 594. If the incoming task is not an XIP task, XIP_Mgmt 82'a takes no further action. On the other hand, if the incoming task is an XIP task, XIP_Mgmt 82'a saves the address of incoming task's descriptor as pointer 214, step 596. Next, XIP_Mgmt 82'a stores Burgermaster's arena address in Burgermaster's selector entry for automatic R/W data segment 106d, step 598. Lastly, XIP_Mgmt 82'a copies the incoming XIP task's task segment descriptor page 206 to the segment descriptors of the pre-allocated pre-determined range of segment selectors 83', step 600.

Figure 20:
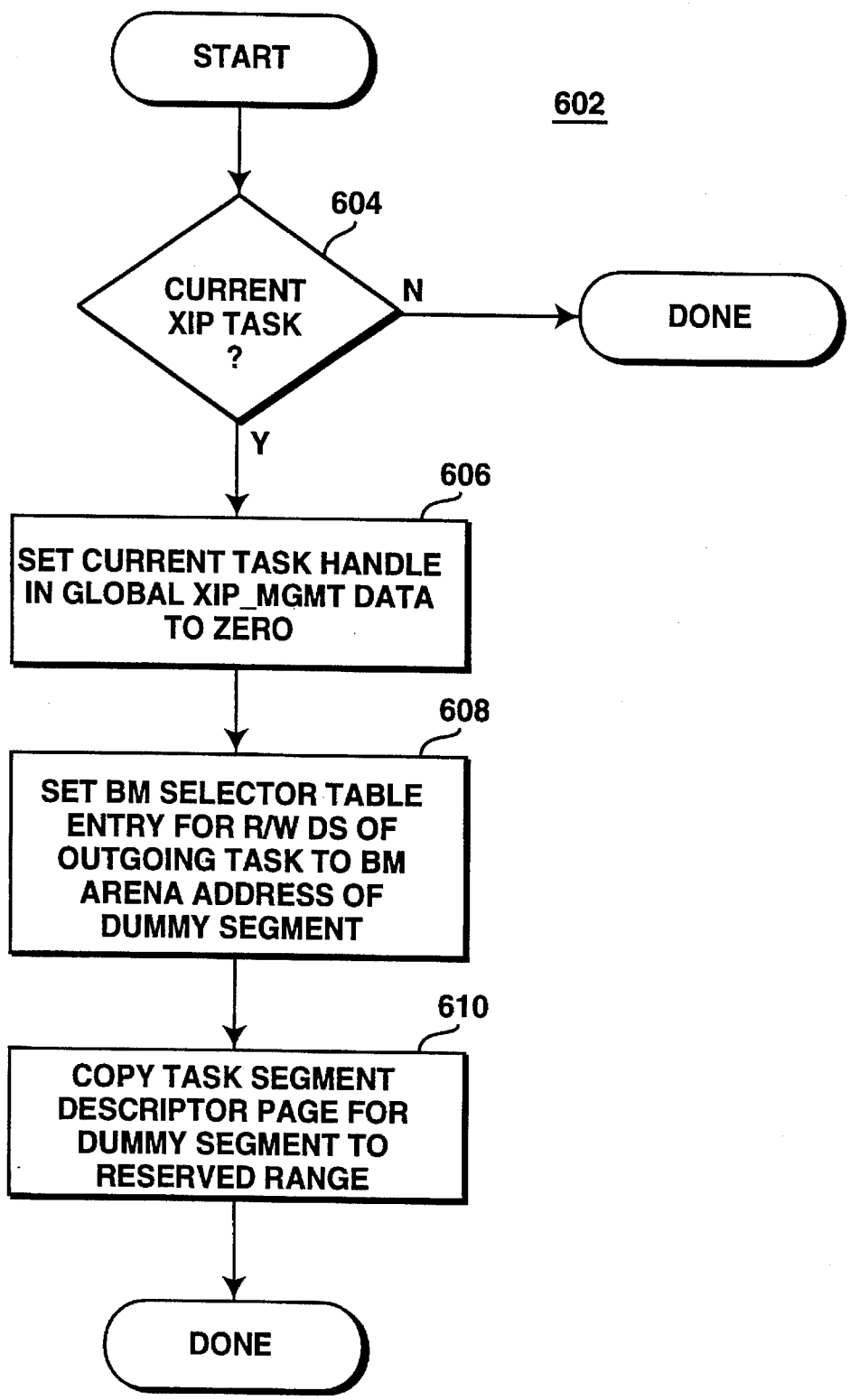

As shown in FIG. 20, at task out time, upon being notified by XIP_LOADER 84', XIP_Mgmt 82'a determines if the outgoing task is an XIP task, step 604. If the outgoing task is not an XIP task, XIP_Mgmt 82'a takes no further action. On the other hand, if the outgoing task is the current XIP task, XIP_Mgmt 82'a zeros out current task descriptor pointer 214, step 606. Next, XIP_Mgmt 82'a sets Burgermaster's selector entry for automatic R/W data segment 106d to Burgermaster's arena address of dummy segment 106e, step 608. Lastly, XIP_Mgmt 82'a copies the dummy segment's task segment descriptor page 206 to the segment descriptors of the pre-allocated pre-determined range of segment selectors 83', step 610.

Figure 21:
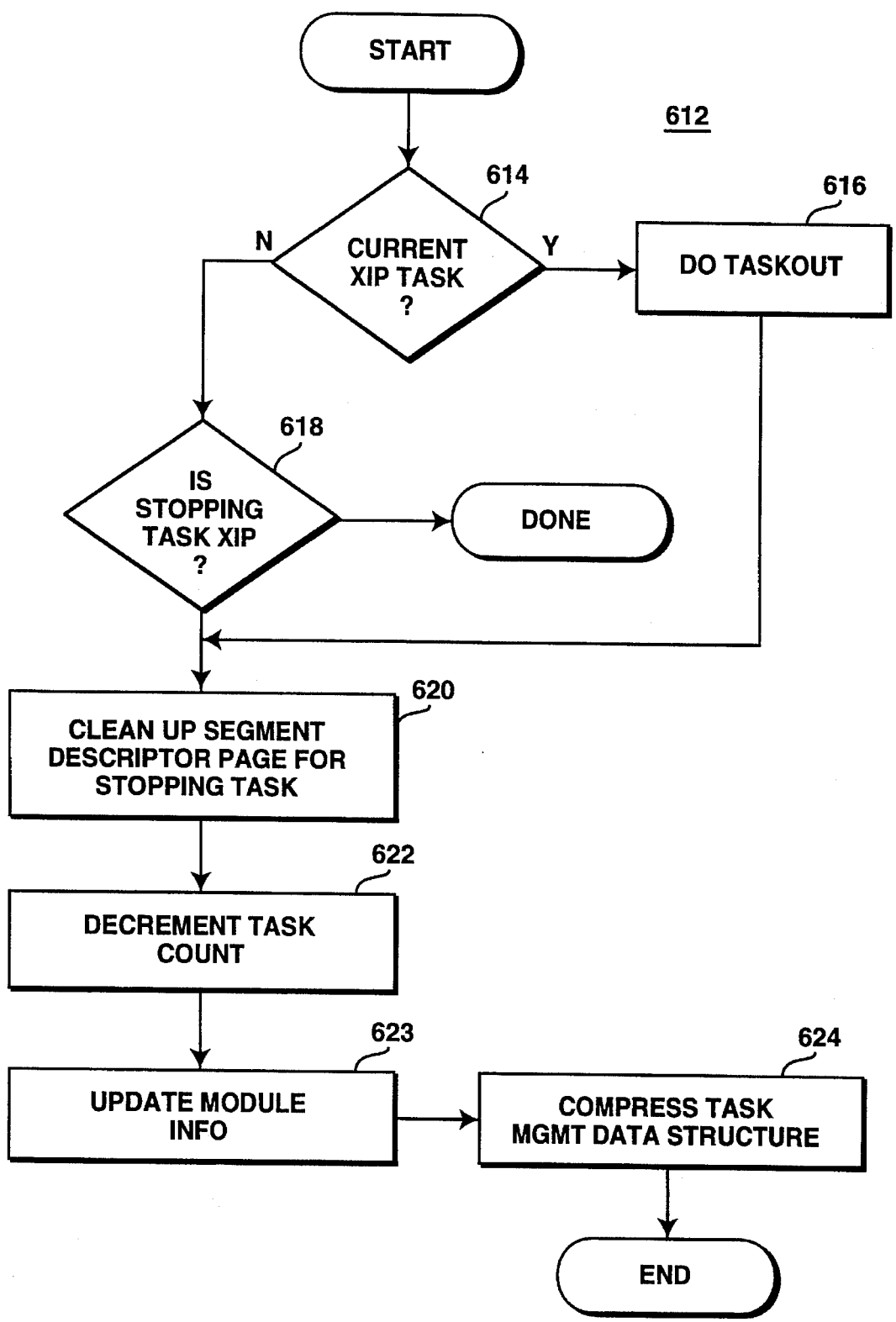

Lastly, as shown in FIG. 21, at task stop time, upon being notified by XIP_LOADER 84', XIP_Mgmt 82'a determines if the stopping task is the current XIP task, step 614. If the stopping task is the current XIP task, XIP_Mgmt 82'a performs the task out steps described earlier and then proceeds to step 620. On the other hand, if the stopping task is not the current XIP task, XIP_Mgmt 82'a determines if the stopping task is an XIP task anyway, step 618. If the stopping task is not an XIP task, XIP_Mgmt 82'a takes no further action. Otherwise, XIP_Mgmt 82'a proceeds to step 620. At step 622, XIP_Mgmt 82'a cleans up task descriptor 204 and corresponding task segment descriptor page 206 of the stopping task, step 620, decrements task count 210, step 622. Additionally, XIP_Mgmt 82'a updates module table accordingly, step 623.

Thus, a method and apparatus for executing application in place from ROM, Flash Memory and the like has been described. While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A computer system comprising:

a storage medium storing a first program having logic for reading a relocatable executable file of a second program intended for execution out of random access memory, and transforming the relocatable executable file into an execute-in-place executable file intended for execution out of a write once or write seldom storage medium within which the execute-in-place executable file is to be stored, the first program sufficiently resolving relocatable items in the relocatable executable file such that no further writings into the execute-in-place executable file is required before the execute-in-place executable file can be executed in place after being stored into the write once/seldom storage medium, the first program sufficiently resolving the relocatable items utilizing a predetermined portion of a memory management data structure of an operating system to be used for managing the in-place execution of the second program and relying on the predetermined portion of the memory management data structure being able to be made available to the execute-in-place second program on demand and fixed up with proper memory addresses at execution time.

2. The computer system as set forth in claim 1, wherein the relocatable items include external references, and the first program resolves some of the external references by restructuring these external references into indirect external references going through a read/write data area of the second program.

3. The computer system as set forth in claim 1, wherein stored in the storage medium further includes a third program having logic for installing the execute-in-place executable file of the second program onto a write seldom storage medium.

4. A computer system comprising:

a storage medium storing a converter program having logic for reading a relocatable executable file of an existing program intended for execution out of random access memory, and transforming the relocatable executable file into an execute-in-place executable file intended for execution out of a write once or write seldom storage medium within which the execute-in-place executable file is to be stored, the converter program sufficiently resolving relocatable items in the relocatable executable file such that no further writings into the execute-in-place executable file is required before the execute-in-place executable file can be executed in place after being stored into the write once/seldom storage medium, the converter program sufficiently resolving the relocatable items utilizing a predetermined portion of a memory management data structure of an operating system to be used for managing the in-place execution of the existing program and relying on the predetermined portion of the memory management data structure being able to be made available to the execute-in-place existing program on demand and fixed up with proper memory addresses at execution time.

5. The computer system as set forth in claim 4, wherein the relocatable items include external references, and the converter program resolves some of the external references by restructuring these external references into indirect external references going through a read/write data area of the existing program.

6. A computer system comprising:

a storage medium storing a linker program having logic for reading a relocatable executable file of a compiled program intended for execution out of random access memory, and transforming the relocatable executable file into an execute-in-place executable file intended for execution out of a write once or write seldom storage medium within which the execute-in-place executable file is to be stored, the linker program sufficiently resolving relocatable items in the relocatable executable file such that no further writings into the execute-in-place executable file is required before the execute-in-place executable file can be executed in place after being stored into the write once/seldom storage medium, the linker program sufficiently resolving the relocatable items utilizing a predetermined portion of a memory management data structure of an operating system to be used for managing the in-place execution of the compiled program and relying on the predetermined portion of the memory management data structure being able to be made available to the execute-in-place second program on demand and fixed up with proper memory addresses at execution time.

7. The computer system as set forth in claim 6, wherein the relocatable items include external references, and the linker program-resolves some of the external references by restructuring these external references into indirect external references going through a read/write data area of the compiled program.

8. A computer system comprising:

a storage medium storing a first program having logic for setting aside a predetermined portion of a memory management data structure of an operating system at system initialization time, re-allocating the set aside predetermined portion of the memory management data structure to a second program when the second program is to be executed in-place, and fixing up the reallocated predetermined portion of the memory management data structure with proper memory addresses of a write once/seldom storage medium within which the execute-in-place second program is stored, the operating system being used to manage the in-place execution of the second program.

9. The computer system as set forth in claim 8, wherein the first program further includes logic for causing random access memory to be allocated for read as well as write data areas of the execute-in-place second program.

10. The computer system as set forth in claim 8, wherein stored in the storage medium further includes a third program having logic for creating and maintaining an execute-in-place task management data structure containing task management information to facilitate multitasking of the execute-in-place second program and other execute-in-place programs created in like manners as the execute-in-place second program, the task management information includes the proper memory addresses of the write once/seldom storage media of the various execute-in-place programs for alternatingly fixing up the predetermined portion of the memory management data structure.

11. A computer system comprising:

a storage medium storing a first program having logic for reading a relocatable executable file of a second program intended for execution out of random access memory, and transforming the relocatable executable file into an execute-in-place executable file intended for execution out of a write once or write seldom storage medium within which the execute-in-place executable file is to be stored, the first program sufficiently resolving relocatable items in the relocatable executable file such that no further writings into the execute-in-place executable file is required before the execute-in-place executable file can be executed in place after being stored into the write once/seldom storage medium, the first program sufficiently resolving the relocatable items utilizing a predetermined range of memory segment selectors of a memory segment descriptor table of an operating system to be used for managing the in-place execution of the second program and relying on the predetermined range of memory segment selectors being able to be made available to the execute-in-place second program on demand and fixed up with proper memory addresses at execution time.

12. The computer system as set forth in claim 11, wherein the relocatable items include external references, and the first program resolves FAR CALL external references by restructuring these FAR CALL external references into indirect FAR CALL external references going through a read/write data segment of the second program.

13. The computer system as set forth in claim 11, wherein the first program further inserts a self-load program segment into the execute-in-place second program, and marking the execute-in-place second program such that the self-load program segment is given control by the operating system when the operating system attempts to load the execute-in-place second program responsive to a request to execute the execute-in-place second program.

14. The computer system as set forth in claim 11, wherein stored in the storage medium further includes a third program having logic for installing the execute-in-place executable file of the second program onto a write once/seldom storage medium.

15. A computer system comprising:

a storage medium storing a first program having logic for pre-allocating a predetermined range of memory segment selectors of an operating system at system initialization time, re-allocating the pre-allocated predetermined range of memory segment selectors to a second program when the second program is to be executed in-place, and fixing up corresponding memory segment descriptors of the predetermined range of memory segment selectors with proper memory addresses of a write once/seldom storage medium within which the execute-in-place second program is stored, the operating system being used to manage the in-place execution of the second program, and the fix-up logic of the first program including logic for aliasing some of the re-allocated predetermined range of memory segment selectors to memory segment selectors dynamically allocated by the operating system, and pseudo fixing up some of the re-allocated predetermined range of memory segment selectors as meaningful bad pointers which will cause memory protection faults whenever referenced by an instruction.

16. The computer system as set forth in claim 15, wherein the first program further includes logic for creating a dummy program segment and a dummy program module using the dummy program segment, and then causing the fix-up logic to fix up the corresponding memory segment descriptors such that the pre-allocated range of memory segment selectors all point to the dummy program segment.

17. The computer system as set forth in claim 15, wherein the first program is given control by a self-load segment made an integral part of the execute-in-place second program, the self-load segment is given control by the operating system when the operating system attempts to load the execute-in-place second program responsive to a request to execute the execute-in-place second program.

18. The computer system as set forth in claim 15, wherein stored in the storage medium further includes a third program having logic for servicing a memory protection fault caused by a reference to a meaningful bad pointer including logic for disassembling the referencing instruction for an identifier of the memory segment selector, fixing up the memory segment selector and relaunching the referencing instruction.

19. The computer system as set forth in claim 18, wherein stored in the storage medium further includes a third program having logic for creating and maintaining an execute-in-place task management data structure containing task management information to facilitate multitasking of the execute-in-place second program and other execute-in-place programs created in like manners as the execute-in-place second program, the task management information includes the proper memory addresses of the write once/seldom storage media of the various execute-in-place programs for alternatingly fixing up the corresponding memory segment descriptors of the predetermined range of memory segment selectors.

20. The computer system as set forth in claim 19, wherein the task management data structure creation and maintenance logic includes logic for creating a task descriptor entry and a pointer to a corresponding task memory segment descriptor page for an execute-in-place task when the execute-in-place task is being started, and destroying the created task descriptor entry and the corresponding task memory segment descriptor page whenever the execute-in-place task is being terminated, the task descriptor entry containing basic descriptive information of the starting execute-in-place task and a pointer to the corresponding task memory segment descriptor page, and the corresponding task memory segment descriptor page containing fix-up information for fixing up the predetermined range of memory segment selectors for executing in-place the starting execute-in-place task.

21. The computer system as set forth in claim 20, wherein the task management data structure creation and maintenance logic further includes logic for allocating memory space for a first table for storing a plurality of the task descriptor entries and a second table for storing a plurality of the corresponding task memory segment descriptor pages, and compressing the first and second tables.

22. The computer system as set forth in claim 19, wherein the first program further includes logic for swapping the fix-up information stored in the task segment descriptor pages into and out of the corresponding memory segment descriptors of the predetermined range of memory segment selectors at task in and task out time whenever an execute-in-place task is being switched in or switched out.

23. In computer system, a computer implemented method for generating an execute-in-place program:
   a) reading a relocatable executable file of a program intended for execution out of random access memory, analyzing relocatable items contained in the relocatable executable file, and tracking information required to resolve these relocatable items;
   b) transforming the relocatable executable file into an execute-in-place executable file intended for execution out of a write once or write seldom storage medium within which the execute-in-place executable file is to be stored, sufficiently resolving the relocatable items in the relocatable executable file such that no further writings into the execute-in-place executable file is required before the execute-in-place executable file can be executed in-place after being stored into the write once/seldom storage medium, utilizing the tracked information and a predetermined portion of a memory management data structure of an operating system to be used for managing the in-place execution of the second program and relying on the predetermined portion of the memory management data structure being able to be made available to the execute-in-place second program on demand and fixed up with proper memory addresses at execution time.

24. The method as set forth in claim 23, wherein the relocatable items include external references, and step (b) includes resolving some of the external references by restructuring these external references into indirect external references going through a read/write data area of the program.

25. The method as set forth in claim 2, wherein the method further comprises the step of (c) installing the execute-in-place executable file of the program onto a write seldom storage medium.

26. In computer system, a computer implemented method for executing in place a program stored in a write once/seldom storage medium, the method comprising the steps of:
   a) setting aside a predetermined portion of a memory management data structure of an operating system at system initialization time, the operating system being subsequently used to manage the in-place execution of the program;
   b) re-allocating the set aside predetermined portion of the memory management data structure to the program when the program is to be executed in-place; and
   c) fixing up the predetermined portion of the memory management data structure with proper memory addresses of the write once/seldom storage medium;
   d) creating and maintaining an execute-in-place task management data structure containing task management information to facilitate multitasking of the execute-in-place program and other execute-in-place programs created in like manners as the execute-in-place program, the task management information includes the proper memory addresses of the write once/seldom storage media of the various execute-in-place programs for alternatingly fixing up the predetermined portion of the memory management data structure.

27. The method as set forth in claim 26, wherein the method further comprises: (d) causing random access memory to be allocated for read as well as write data areas of the execute-in-place second program.

* * * * *

UNITED STATES PATENT AND TRADEMARK OFFICE
CERTIFICATE OF CORRECTION

PATENT NO. : 5,581,768

DATED : December 3, 1996

INVENTOR(S) : Garney et al.

It is certified that error appears in the above-identified patent and that said Letters Patent is hereby corrected as shown below:

In column 24 at line 33 delete "claim 2," and insert --claim 23,--

Signed and Sealed this

Sixth Day of May, 1997

Attest:

BRUCE LEHMAN

Attesting Officer

Commissioner of Patents and Trademarks